(12) United States Patent
Keller

(10) Patent No.: US 7,334,222 B2
(45) Date of Patent: Feb. 19, 2008

(54) METHODS AND APPARATUS FOR DEPENDENCY-BASED IMPACT SIMULATION AND VULNERABILITY ANALYSIS

(75) Inventor: Alexander Keller, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 10/241,397

(22) Filed: Sep. 11, 2002

(65) Prior Publication Data

US 2004/0049372 A1    Mar. 11, 2004

(51) Int. Cl.
    *G06F 9/45*    (2006.01)
(52) U.S. Cl. .................................................. 717/135
(58) Field of Classification Search ............... 717/135; 709/223
    See application file for complete search history.

(56) References Cited

U.S. PATENT DOCUMENTS

| | | | |
|---|---|---|---|
| 4,751,635 A | | 6/1988 | Kret |
| 5,161,118 A | * | 11/1992 | Matsuda et al. ............ 708/542 |
| 5,493,682 A | | 2/1996 | Tyra et al. |
| 5,500,940 A | * | 3/1996 | Skeie ........................... 714/25 |
| 5,652,867 A | * | 7/1997 | Barlow et al. ................. 703/6 |
| 5,721,824 A | | 2/1998 | Taylor |
| 5,805,891 A | | 9/1998 | Bizuneh et al. |
| 5,835,777 A | | 11/1998 | Staelin |
| 5,867,714 A | | 2/1999 | Todd et al. |
| 5,917,831 A | | 6/1999 | Kätker et al. |
| 5,953,533 A | | 9/1999 | Fink et al. |
| 5,960,196 A | | 9/1999 | Carrier, III et al. |
| 5,999,740 A | | 12/1999 | Rowley |
| 6,009,525 A | | 12/1999 | Horstmann |
| 6,226,760 B1 | * | 5/2001 | Burkhardt et al. ............ 714/33 |
| 6,496,814 B1 | * | 12/2002 | Busche ........................ 706/21 |
| 6,651,187 B2 | * | 11/2003 | Lacey, III ..................... 714/38 |
| 2001/0042642 A1 | * | 11/2001 | King .......................... 175/40 |
| 2002/0147966 A1 | * | 10/2002 | Frazier ...................... 717/127 |
| 2003/0187967 A1 | * | 10/2003 | Walsh et al. ................ 709/223 |

FOREIGN PATENT DOCUMENTS

JP    2001-125854    5/2001

(Continued)

OTHER PUBLICATIONS

Bushnell et al., Simulating the Impact of Changes . . . , 1980, IEEE, p. 53-59.*

(Continued)

*Primary Examiner*—John Chavis
(74) *Attorney, Agent, or Firm*—David R. Irvin; Ryan, Mason & Lewis, LLP

(57) ABSTRACT

A technique for determining a potential impact of a simulated condition of at least one subject component associated with a computing environment comprises the following steps/operations. First, one or more components in the computing environment which depend on the at least one subject component are identified and a potential condition status associated with each of the one or more identified components is determined. Then, information is presented to a user with respect to at least a portion of the one or more identified components based on the corresponding condition status. By way of example, the inventive techniques may be applied to a distributed computing environment. The computing environment may also be an autonomic computing environment.

30 Claims, 14 Drawing Sheets

FOREIGN PATENT DOCUMENTS

| | | |
|---|---|---|
| JP | 2001-222424 | 8/2001 |
| WO | WO 01/75677 | 10/2001 |

OTHER PUBLICATIONS

Numerical Tech. Inc., CreditBrowser, web.archive.org, 1999, p. 1-12.*

U.S. Appl. No. 10/241,213, filed Sep. 11, 2002, A. Keller et al., entitled "Methods And Apparatus for Root Cause Identification and Problem Determination in Distributed Systems".

U.S. Appl. No. 10/241,162, filed Sep. 11, 2002, A. Keller et al., entitled "Methods And Apparatus for Managing Dependencies in Distributed Systems".

U.S. Appl. No. 10/241,189, filed Sep. 11, 2002, A. Keller et al., entitled "Methods And Apparatus for Topology Discovery and Representation of Distributed Applications and Services".

U.S. Appl. No. 10/241,214, filed Sep. 11, 2002, A. Keller et al., entitled "Methods And Apparatus for Impact Analysis and Problem Determination".

The Institute of Electrical and Electronics Engineers Standard 1387.2 (entitled "Portable Operating System Interface (POSIX) system administration, part 2: Software Adminstration," IEEE, 1995).

Open Group (Systems Management: Distributed Software Administration, CAE Specification C701, The Open Group, Jan. 1998).

Gruschke et al., ∂Integrated Event Management: Event Correlation Using Dependency Graphs, DSOM '98, 1998.

Kätker et al., Fault Isolation and Event Correlation for Integrated Fault Management, IM '97, 1997.

P. Horn, "Autonomic Computing: IBM's Perspective on the State of Information Technology," IBM Research, Oct. 2001.

* cited by examiner

| APIS | FUNCTIONAL DESCRIPTION |
|---|---|
| GETIMPACTDIRECTDEPENDENTS ( ) | RETRIEVE DIRECT DEPENDENTS OF A SERVICE LOCATED ON A SPECIFIC HOST |
| GETIMPACTHIGHESTDEPENDENTS ( ) | RETRIEVE HIGHEST DEPENDENTS OF A SERVICE LOCATED ON A SPECIFIC HOST |
| GETIMPACTDEPENDENTSRECURSIVE ( ) | RECURSIVE DRILL-UP; RETRIEVE ALL DEPENDENTS OF A SERVICE LOCATED ON A SPECIFIC HOST |
| GETIMPACTEDUSERS ( ) | RETRIEVE ALL USER-IDS THAT HAVE SUBSCRIBED TO A DEPENDENT OF A SERVICE LOCATED ON A SPECIFIC HOST |
| GETIMPACTEDHOSTS ( ) | RETRIEVE ALL HOST NAMES THAT HOST A DEPENDENT OF A SERVICE LOCATED ON A SPECIFIC SYSTEM |
| GETIMPACTEDTOPNDEPENDENTS ( ) | RETRIEVES THE DEPENDENTS THAT ARE MOSTLY IMPACTED (ACCORDING TO WEIGHT OF DEPENDENCIES); N SPECIFIES THE MAXIMUM NUMBER OF ITEMS TO BE RETRIEVED |
| GETIMPACTEDTOPNHIGHESTDEPENDENTS ( ) | RETRIEVES THE HIGHEST DEPENDENTS THAT ARE MOSTLY IMPACTED (ACCORDING TO WEIGHT OF DEPENDENCIES); N SPECIFIES THE MAXIMUM NUMBER OF ITEMS TO BE RETRIEVED |

METHODS AND APPARATUS FOR DEPENDENCY-BASED IMPACT SIMULATION AND VULNERABILITY ANALYSIS

CROSS REFERENCE TO RELATED APPLICATIONS

The present application is related to the concurrently-filed U.S. patent applications respectively identified as: Ser. No. 10/241,213 entitled: "Methods And Apparatus For Root Cause Identification and Problem Determination in Distributed Systems;" Ser. No. 10/241,162 entitled: "Methods And Apparatus For Managing Dependencies in Distributed Systems;" Ser. No. 10/241,189 entitled: "Methods And Apparatus For Topology Discovery and Representation of Distributed Applications and Services;" and Ser. No. 10/241,214 entitled: "Methods And Apparatus For Impact Analysis and Problem Determination;" the disclosures of which are incorporated by reference herein.

FIELD OF THE INVENTION

The present invention relates to distributed computing systems and, more particularly, to methods and apparatus for analyzing and determining the potential impact of a simulated service outage based on dependencies between the various components of such distributed computing systems.

BACKGROUND OF THE INVENTION

The identification and tracking of dependencies between the components of distributed systems is becoming increasingly important for integrated fault management. Applications, services and their components rely on a variety of supporting services that might be outsourced to a service provider. Moreover, emerging web-based (world wide web-based) business architectures allow the composition of web-based e-business (electronic business) applications at runtime.

It is to be understood that the term "runtime" generally refers to the time period when a piece of software is being executed and active in a computer system's memory, as opposed to being dormant and merely sitting in storage on a computer's hard drive. Thus, being able to compose e-business applications at runtime means having the capability to do so without the need to bring down and restart the system/application and without the need to recompile the application. Traditionally, the lifecycle of a computer program is: write program code -> compile (translate into machine code) -> run. Thus, with the above capability, one can assemble several pieces of software to form a new application "on-the-fly," i.e., without the need to bring down/compile/restart the application.

Consequently, however, failures occurring in one service affect other services being offered to a customer, i.e., services have dependencies on other services. Dependencies exist between the components of different services on a single system and also between the client and server components of a service across multiple systems and domains. Herein, services that depend on other services are referred to as dependents, while services on which other services depend are referred to as antecedents.

It is important to note that a service often plays both roles (e.g., a name service is required by many applications and services but depends, itself, on the proper functioning of other services, such as the operating system and the network protocols and infrastructure). Furthermore, dependency relationships are transitive, i.e., the dependent of a given component requires, in addition to the component itself, the components' antecedent(s).

Dependencies exist between various components of a distributed system, such as end-user services, system services, applications and their logical and physical components. However, service dependencies are not made explicit in today's systems, thus making the task of problem determination, isolation and resolution particularly difficult.

Existing art in the area of software development (such as U.S. Pat. Nos. 4,751,635 and 5,960,196), maintenance (such as U.S. Pat. No. 5,493,682) and software packaging (such as U.S. Pat. No. 5,835,777) deal with individual software elements and modules that form the atomic parts of a program package and require the availability of program source code in order to build software and bundle it into software products. Source code is available to the software developer and not to the service user. The invention primarily focuses on software products that are already packaged.

The Institute of Electrical and Electronics Engineers Standard 1387.2 (entitled "Portable Operating System Interface (POSIX) system administration, part 2: Software Administration," IEEE, 1995) addresses software distribution/deployment/installation. The IEEE standard defines a mechanism for ensuring that new software components (which are going to be installed) do not conflict with an already existing software installation. The IEEE standard identifies three kinds of relationships: prerequisite, exrequisite, corequisite, that facilitate such compatibility checks. This is done individually for every system on which new software needs to be installed. With the IEEE standard, the software inventories present on other systems are not taken into account. Furthermore, the IEEE standard does not deal with instantiated applications and services and therefore does not represent any means of determining the dependencies between components at runtime.

Open Group (Systems Management: Distributed Software Administration, CAE Specification C701, The Open Group, January 1998) extends IEEE 1387.2 by defining several commands (swinstall, swlist, swmodify, etc.) that are invoked by software installation tools on a specific system. Open Group also defines a software definition file format to make sure that the information required by the aforementioned commands is available from the system on which the commands are invoked. The shortcomings of IEEE 1387.2 (i.e., confined to a single isolated system, no means for determining software dependencies at runtime) also apply to the Open Group specification.

Current Operating System Inventory implementations (such as the IBM AIX Object Data Manager (ODM), the Linux Red Hat Package Manager (RPM) or the Microsoft Windows Registry) follow either the OpenGroup specification and the IEEE 1387.2 standard or describe the software inventory in a proprietary format. Thus, the aforementioned limitations also apply to such Current Operating System Inventory implementations.

Techniques for electronic software distribution of whole program packages (such as U.S. Pat. Nos. 6,009,525 and 5,721,824) or updates/corrections/fixes/patches (such as U.S. Pat. Nos. 5,999,740, 5,805,891, and 5,953,533) are, by definition, restricted to the distribution/deployment/installation of (one or many at a time) physical software packages and do not take the runtime stages of applications into account. In addition, they deal with one system at a time and do not take the cross-system aspects of applications and services into account.

Techniques for determining conflicts in existing software/hardware configurations (such as U.S. Pat. No. 5,867,714) are also confined to a single system and do not take runtime aspects into account.

While existing work (such as U.S. Pat. No. 5,917,831), often within the scope of event correlation (see, e.g., Gruschke et al., "Integrated Event Management: Event Correlation Using Dependency Graphs, DSOM '98, 1998 and Kätker et al., "Fault Isolation and Event Correlation for Integrated Fault Management, IM '97, 1997), has focused on identifying and describing service dependencies in a proprietary format, it has remained unclear how dependency information can actually be exchanged between different entities of the fault management process. Since it is unlikely that the different parties involved in the fault management process of outsourced applications use the same toolset for tracking dependencies, it is of fundamental importance to define an open format for specifying and exchanging dependency information.

Also, due to the heterogeneity associated with components of the distributed system with which the fault management process is involved, determining the potential impact of a simulated system failure (e.g., service outage) is extremely difficult, given the limitations of existing techniques.

To sum up, a few techniques relating to the determination of relationships between software products have been described and implemented in the existing art. These existing techniques suffer from one or more of the following shortcomings:

(a) they address only the installation and deployment phases of a software product; i.e., they do not attempt to capture the design and runtime aspects;

(b) they do not deal with end-to-end applications and services that span multiple systems; i.e., they address the characteristics of software residing on a single, isolated system;

(c) software inventory information is described in a proprietary format that makes it extremely difficult to share this information among various heterogeneous systems; and (d) they do not effectively identify the potential impact of a simulated service outage.

SUMMARY OF THE INVENTION

The present invention provides techniques for identifying a potential impact of a simulated component failure in accordance with a computing environment, and determining a vulnerability of the computing environment with respect to such a simulated component failure. By way of example, the inventive techniques may be applied to a distributed computing environment. The computing environment may also be an autonomic computing environment.

For example, in one aspect of the invention, a computer-based technique for determining a potential impact of a simulated condition of at least one subject component associated with a computing environment comprises the following steps/operations. First, one or more components in the computing environment which depend on the at least one subject component are identified and a potential condition status associated with each of the one or more identified components is determined. Then, information is presented to a user with respect to at least a portion of the one or more identified components based on the corresponding condition status.

The information presented to the user may comprise a representation of a vulnerability associated with at least a portion of the one or more identified components based on the corresponding condition status. By way of example, the representation may comprise a vulnerability map indicating a respective likelihood of failure associated with each of the one or more identified components. Further, the information presented to the user may comprise a list of potentially affected end-users, a list of potentially affected components and/or a list of potentially affected hosts. Still further, the information presented to the user may comprise a comparison of a first determination of the potential impact of the simulated condition of the at least one subject component to a second determination of the potential impact of the simulated condition of the at least one subject component.

Also, the subject component may be an existing component in the computing environment (e.g., an actual component used in the environment) or the subject component may not be an existing component in the computing environment (e.g., a virtual component representing a component that may possibly be used in the environment).

Furthermore, identification of the one or more components may comprise traversing at least a portion of a model representative of an existence of one or more relationships associated with at least a portion of components of the computing environment and which is capable of accounting for a full lifecycle (e.g., including deployment, installation and runtime) associated with at least one component of the computing environment. The model may be in a form comprising a functional categorization, a structural categorization and an operational categorization.

By way of example, a component may be a service, an application, middleware, hardware, a device driver, an operating system or a system associated with the computing environment. However, the term "component" is not limited to these examples.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 14 depicts examples of impact simulation and vulnerability analysis application programming interfaces according to an embodiment of the present invention.

DETAILED DESCRIPTION OF PREFERRED EMBODIMENTS

Figure 1:
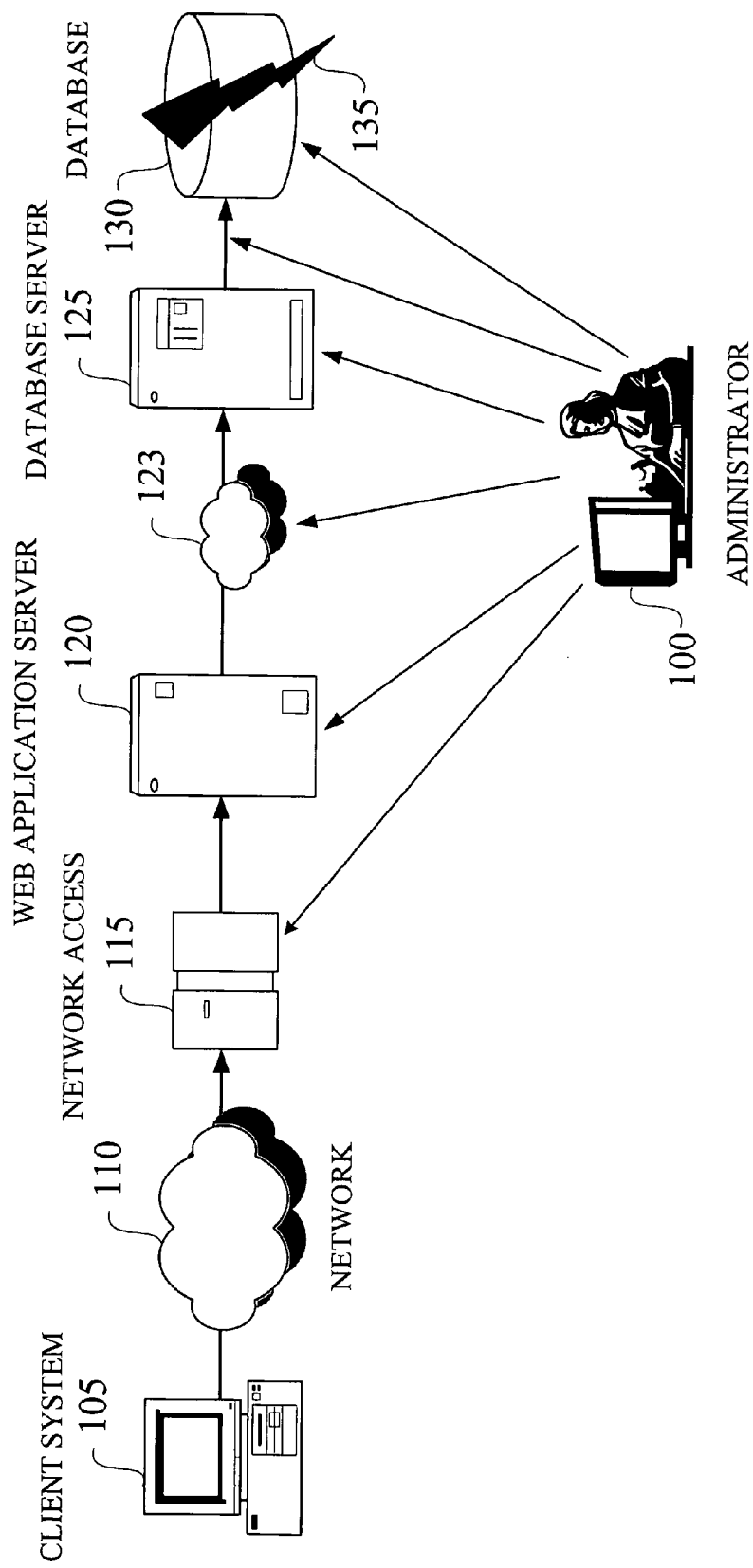
FIG. 1 is a block diagram illustrating an example of a client-server application architecture with which features of the present invention can interact to produce information.

The present invention will be explained below in the context of an illustrative distributed computing environment. However, it is to be understood that the present invention is not limited to such a particular computing environment. Rather, the invention is more generally applicable to any computing environment in which it is desirable to manage (e.g., compute, query, etc.) dependencies in order to make the task of problem determination, isolation and resolution significantly easier.

As used herein, depending on the context of the discussion, the term "system" may be used to refer to a computer system, a software system and/or some combination thereof. The term "system" may also be used to refer to an application and/or a service. Thus, the phrase "multiple systems" refers to a collection of several systems. Also, the term "component" may refer to a system, itself, or one or more portions of a system.

As mentioned above, service dependencies are not made explicit in today's systems, thus making the task of problem determination, isolation and resolution particularly difficult. Solving this problem requires the determination and computation of dependencies between services and applications across different systems and domains, i.e., establishing a "global" service dependency model and enabling system administrators to navigate through the resulting directed graph from the top to the bottom and in reverse order. The need for such a mechanism is best illustrated by the following two scenarios.

The first scenario deals with managing outsourced services, typically offered by Internet or Application Service Providers (ISP/ASP). Outsourcing services leads to layered service hierarchies where, e.g., the services of an ASP depend on the IP-connectivity (Internet Protocol-connectivity) offered by an ISP, which, in turn, relies on the wide area network of a telecom carrier. At every layer, a service is accessed through a Service Access Point (SAP). A SAP delimits the boundary between the different organizational domains and is the place where Service Level Agreements (SLAs) are defined and observed. Usually, this is done at every layer by monitoring a set of specific parameters that are exposed by the provider. In case of an outage or performance degradation in an upper-layer service, it is necessary to traverse the service hierarchy from the top to the bottom to identify the root cause of the problem.

The second scenario deals with the regular maintenance tasks that can not be done "on-the-fly" and therefore affect services and their customers: e.g., e-mail servers get updated with a new release of their operating system, network devices are exchanged or upgraded with a new firmware version, etc. In all cases, it is important for the network and server administrators to determine in advance how many and, more specifically, which services and users are affected by the maintenance. We refer to this task as impact analysis.

Taking the concept of impact analysis further leads to the concept of impact simulation and vulnerability analysis. Upon selection of a specific service (or a specific service instance) running on a computer system, impact simulation allows a determination of what other services, users and host systems are likely to be affected by the outage of a service. This enables an administrator to simulate system outages and analyze the vulnerability of their environment proactively in order to identify existing weaknesses, fix them and verify whether the applied fix was successful. When an impact analyzer is fed systematically with service data, a "vulnerability map" of the distributed system environment may be established.

The aforementioned tasks are further exacerbated by the following factors.

Dependency models provide a straightforward means to identify possible root causes of an observed problem. If the dependency graph for a system is known, navigating the graph from an impaired service towards its antecedents (being either co-located on the same host or on different systems) will reveal which entities might have failed. Traversing the graph towards its root (i.e., in upwards direction) yields the dependents of a service, i.e., the components that might fail if this service experiences an outage. The following issues need to be addressed.

(a) Scale: The number of dependencies between many involved systems can be computed, but may become very large. From an engineering viewpoint, it is often undesirable (and sometimes impossible) to store a complete, instantiated dependency model at a single place. Traditional mechanisms used in network management platforms such as keeping an instantiated network map in the platform database therefore can not be applied to dependencies due to the sheer number and the dynamics of the involved dependencies.

These two facts make it prohibitive to follow a "network-management-style" approach for the deployment of application, service and middleware dependency models. As an example, typical data centers of service outsourcers host vast amounts (several thousands) of web application and database servers. This implies a huge number of simultaneously running program instances of, e.g., web application and database servers. A system capable of constructing a dependency model should provide features that allow appropriate scalability by distributing the storage and computation of dependencies across the systems involved in the management process.

(b) Dynamics: Hosted applications (running within web application servers) have a very short lifetime, often only a few seconds. Upon reception of a request, the business logic of a web application (usually implemented as one or more Java Servlets) gets instantiated by the servlet engine of the application server, performs its tasks and is then removed by the servlet engine. Consequently, a system for computing dependencies among these dynamic entities should address the trade-off between the accuracy of the data and the workload generated for retrieving this data.

(c) Heterogeneity: Heterogeneity comes in three different flavors. First, the services offered to customers differ to a large degree. Second, there may be various providers involved in offering a service to a customer. Finally, the products implementing a service may stem from a variety of vendors. A system for computing dependencies should provide a language that is independent of specific operating systems, network protocols, software products and the services offered to a customer.

(d) Manual maintenance of Dependency Data: The acquisition of a service dependency model, even confined to a single host system, is a challenge on its own as today's systems usually do not provide appropriate management instrumentation. It is to be understood that the term "instrumentation" refers to program code that exposes the management characteristics and capabilities of a (managed) resource through a well-defined (sometimes even standardized) interface so that it can be accessed by management applications. Further, even if available from managed resources, dependency data is not exploited by today's management systems. Instead, the dependency information not only has to be entered manually into a specific management component, but also in a proprietary format. The dependency information is therefore incomplete, outdated (due to the error-prone manual processing), and sometimes even inconsistent because different operators enter the rules independently and there is no way to check the rule base for consistency in an automated way.

(e) Taxonomy for Dependencies: The notion of dependencies is very coarse and needs to be refined in order to be useful. Examples for this are the strength of a dependency (indicating the likelihood and the degree to which a component is affected if its antecedent fails), the criticality (how important this dependency is with respect to the goals and policies of an enterprise), the degree of formalization (i.e., how difficult it is to obtain the dependency) and many more. There is a need to add attributes to dependencies that allow them to be qualified more appropriately; and accordingly, a need to reflect these attributes in the dependency representation.

(f) Problem Determination Features: Further facilities for combining local dependency graphs, stored on every system, into a uniform dependency model are desired. In addition, these facilities should provide an API (application programming interface) allowing management applications to issue queries against the dependency model. These queries will be allowed to retrieve the entities that a specific service directly depends on, or to recursively determine a whole set of nodes, including sub-antecedents. The list of nodes received by the management application enables it to perform specific problem determination routines to check whether these services are operational.

The previous discussion shows that it is important to establish a mapping between three different stages of a service lifecycle:

(a) an (abstract) service being offered to customers, e.g., "Web Hosting," "Managed Storage," "IP Connectivity," "Managed Database," etc.;

(b) the implementation of a service, i.e., the product(s) being used for providing the service, e.g., "IBM Universal Database version 7.1," "WebSphere Application Server version 3.2;" and (c) the running instance(s) of an implementation, i.e., the process or task, e.g., "db2 daemon," "nfs daemon."

While the task of individually obtaining information available at every single stage is feasible, the combination of the three stages into a uniform dependency model is challenging and has not been done in previous work. In addition, there is a need for establishing an efficiently computable dependency model that addresses the requirements of scale, dynamics and heterogeneity of the underlying environment while eliminating the need for human interaction and maintenance of dependency data.

As will be illustrated below in the context of the figures, the present invention addresses these and other needs. That is, the present invention has features which compute runtime dependencies (a "dependency model") between components of a distributed system on behalf of a management application. The invention offers a generic and uniform approach for retrieving dependency information from computer systems that provide a mechanism for retrieving configuration information of individual computer systems or that provide such data in a machine-readable format.

One benefit of the aforementioned system is that a large amount of application/service management information can be obtained from these computer systems without having the need to instrument individual applications/services. However, if such application/service instrumentation is available, it can be used by the present invention.

The execution of the system described by the present invention may be triggered either by a specific (management) application (such as: impact analyzer, root cause analyzer), a network management platform (such as IBM/Tivoli NetView, HP OpenView or Aprisma Spectrum) or a management application based on traditional network management systems and platforms.

The present invention provides, inter alia, features for:

(a) observing performance degradations and outages of subscribed services;

(b) tracking down the root cause of the problem by traversing the different layers of the dependency model from the top to the bottom (since various services may be outsourced to other service providers, this (recursive) traversal of a dependency model crosses domain boundaries);

(c) analyzing the impact of a service outage by navigating the dependency model from the bottom to the top; and (d) simulating the potential impact of a service or host system outage on other services, users and other host systems.

The invention combines dependency information that is available during the lifecycle of an application or service (i.e., from the design to deployment, installation and runtime stages of an application/service). This information is kept within the following models:

(a) Functional Model: In a preferred implementation, the functional model defines dependencies between different generic services (database service, name service, web application service, connectivity service, etc.). The functional model does not describe client/server relationships within a specific service. In addition, the functional model neither takes into account which concrete products have been chosen to implement the services nor their actual configuration. The functional model establishes the principal constraints to which the other models (described below) are bound, i.e., further models may refine the dependencies defined in the functional model with respect to a concrete system infrastructure but should not introduce new dependencies between service categories. The model is very compact and generic and is preferably stored on the managing system.

(b) Structural Model: In a preferred implementation, the structural model contains the detailed descriptions of software components that realize the services defined in the functional model. The structural model provides details captured during the installation/deployment phase and complements the functional model by taking the software inventory of concrete systems into account. The structural model provides information about which services are installed and configured on a specific system and, for every service, whether the system operates in a client or a server role. The potentially high numbers of systems and services make it difficult to track these dependencies from a remote location. It is thus desirable to store this model close to or at the managed resources.

(c) Operational Model: In a preferred implementation, when software packages get instantiated and bindings between services and applications are established, the operational model of dependencies is created. The high degree of dynamics of this model and large number of involved systems places a limitation on the extent to which the complete model can be instantiated and stored. It is not practical to define and store such a model, rather, the model has to be computed dynamically and stepwise. The operational model is therefore computed "on demand" and relies on the functional and structural models.

As is to be expected, the amount of dependencies and their dynamics are extremely high in large-scale distributed systems. The features of the present invention keep their impact on the distributed system (in terms of resource and bandwidth usage) as small as possible and leave as many configuration options that might affect the performance up to the user. Examples for this are: the time intervals for retrieving an updated dependency model, the range of the systems whose dependencies should be tracked, the depth of the dependency model (only services immediately affected versus transitive closure for a given service versus whole service hierarchy).

The present invention preferably exploits the following characteristics of dependency information:

(a) Dependencies between different services are layered. Furthermore, their dependency graph is directed and acyclic. The latter statement also reflects experiences with IP-based networked services, such as DNS (Domain Name System), NFS (Network File System), DFS (Distributed File System), NIS (Network Information System), etc., but there may be cases where mutual dependencies may occur in some systems. A pathological example for such a mutual dependency is a DNS server that mounts the file system in which its DNS configuration is stored via NFS from a remote system. While such a configuration is technically feasible, it reflects flaws in the system design because this leads to an unstable system whose bootstrapping might be non-deterministic and thus should be avoided. A dependency-checking application that discovers cyclic dependencies should issue a warning to an administrator.

(b) Every dependency is visible at a customer/provider domain boundary and made explicit by means of SLAs. It follows that the number of observable dependencies is finite.

(c) Dependency models allow a top-down and bottom-up traversal of dependency chains.

(d) Dependencies between different systems ("inter-system") are perceived as dependencies between the client and server parts of the same service. It is not possible that a client for service A issues requests to a server which provides a different service B.

One goal of the present invention is to retrieve information mainly from a few well-known/well-defined places (e.g., system repositories) in order to achieve a maximum degree of independence from concrete service/application instrumentation. In order to achieve this, the invention defines a minimal and sufficient amount of commonly available dependency information.

The invention comprises facilities for storing dependency models persistently or leaves this to the discretion of a management application or another service that uses the invention.

The invention is enabled to have a notion of history in order to detect and determine changes in the dependency model. In this case, the invention provides a publish/subscribe interface for notifying software components that have previously registered for changes within the dependency model. Another possible use of the invention is to leave the detection of changes in the dependency model up to the discretion of a management application (or a change management service) to issue periodic calls to the invention in order to determine whether changes in the dependency model have occurred.

Furthermore, as will be illustrated herein below, the present invention provides techniques for performing impact simulation and vulnerability analysis.

The invention comprises a graphical user interface that depicts the various services, users, and host systems, together with their dependencies. The graphical user interface displays, upon selection of a specific service by an administrator, a map which visually presents services/users/host systems that are likely to be affected by the outage of the service. Such a "vulnerability map" helps to pinpoint existing weaknesses and single points of failure within a distributed environment.

The invention also comprises a facility to introduce "synthetic" (i.e., virtual) service instances/users/host systems into the distributed environment to assess whether a newly introduced service/host system would help eliminate existing vulnerabilities.

The present invention also simulates the impact of a service outage on other services, users and host systems of a distributed environment. Determining the impact of a service outage implies the traversal of the service hierarchy from the bottom to the top to identify the dependent services that are likely to experience a problem, since the problem may be propagated from the service in question to the dependents. This traversal from the service where the outage has been observed towards its dependents retrieves either the entities that directly depend on a specific service, the whole set of services that depend on a specific service, or only the highest service layer comprising end-user services. The list of dependent nodes retrieved by an impact simulator enables an administrator to perform a "what-if" analysis to pinpoint the vulnerabilities of a distributed environment with respect to service outages. It is important to note that the impact simulator filters out nodes that do not have a dependency relationship to a service that is assumed to be the root cause of a problem.

The invention allows an administrator to select a specific service or a specific service instance running on a computer system and determine what other services, users and host systems are likely to be affected by the outage of a service. This enables the administrator to simulate system outages and analyze the vulnerability of their environment proactively in order to identify existing weaknesses, fix them and verify whether the applied fix was successful. When an impact analyzer is fed systematically with service data, the administrator is able to establish a vulnerability map of the distributed environment.

An illustrative use of the invention in establishing a vulnerability map of a distributed environment is as follows. An administrator uses the graphical user interface that depicts the services of the distributed environment and their dependencies, selects a specific service on a host system, and runs the impact simulator by querying for the services that will be affected by an outage. The impact simulator then computes a list of results, which are preferably displayed on the graphical user interface by changing the color of the icons representing the affected services (eventually depending on the degree of probability or severity). Such a vulnerability map enables an administrator to pinpoint the "weak" services in the distributed environment based on actual ("real-life") data without having to interfere with the components of the actual environment.

Further, the methodologies of the invention may be performed for one or more subject components substantially concurrently (e.g., for one component at a time, or for multiple components in parallel). At least a portion of results of the methodologies of the invention may be persistently stored, however, such results may not be persistently stored.

Still further, a history of results associated with the methodologies of the invention may be maintained. Thus, the invention comprises a facility to store the results of running the impact simulator such that they may be compared against previous impact simulation results. This allows an assessment or verification of whether operations to eliminate weaknesses and single points of failure from a distributed system, as implemented between one execution of the impact simulator and one or more other executions of the impact simulator, have been successful.

Given the above realizations made in accordance with the present invention and general features associated with the present invention, the remainder of the detailed description will provide an illustrative explanation of techniques for implementing such realizations and features in the context of FIGS. 1 through 14.

Referring initially to FIG. 1, a block diagram illustrates an example of an electronic commerce system in the form of a client-server application architecture with which the features of the present invention can interact to produce information. The architecture of FIG. 1 will be described below to illustrate how such an architecture may handle a transaction in the absence of the techniques of the invention.

As depicted, a client system 105 is used to initiate a request, for example via keyboard. Requests, however, could be initiated by any conventional means such as by mouse click, voice command, bar code swipe, etc. Examples of the client system 105 are personal computers, kiosks, data entry terminals, scanners, telephones, pagers, handheld or wearable devices, wireless devices, personal digital assistants, network-enabled watches, etc.

The request is acted upon locally where the request is formulated and forwarded to a web application server 120 over a network 110 and by passing through one or many network access 115 devices. An example of the network 110 and communication protocol are socket-based communications riding on a TCP/IP (Transmission Control Protocol/Internet Protocol) transport across a local area network (LAN) that is connected by network access 115 devices such as routers and switches to a wide area network (WAN) containing many switching locations that create a virtual circuit to a service provider and eventually to a web application server 120. Examples of a web application server 120 are high-end personal computers, RISC-based PowerPC's, UNIX-based workstations, minicomputers or mainframe computers running software fielding requests from clients and distributing the requests to appropriate back-end database servers when appropriate.

For illustrative purposes, an electronic commerce transaction initiated within a web browser (running on the client system 105) to purchase an item using the Internet will now be described. It is to be understood that the techniques of the invention may work with any form of transaction. Examples of web application servers include, but are not limited to, those available from IBM Corporation under the trademark WEBSPHERE, from BEA Systems, Inc. under the trademark WEBLOGIC, or from Lotus under the trademark LOTUS DOMINO SERVER.

In the example transaction, the business logic of the web application server 120 processes the incoming request and provides authentication and/or identification of the client system 105. Once the business logic implemented by the web application server 120 determines that the client may proceed with the purchase, it communicates another request via a network 123 to a database server 125 to decrement the inventory. The database server 125 processes the request, accesses its database 130 and prepares a response to the web application server 120. Examples of database servers include, but are not limited to those sold by Microsoft under the trademark SQL/SERVER or TRANSACTION SERVER and by IBM Corporation under the trademark DB2 UNIVERSAL DATABASE SERVER.

The web application server 120 receives the response from the database server 125 and returns it via the network 110 to the client system 105. The client system 105 then processes the response to format it for display and presents the response for the transaction initiator to review.

An administrator 100 observes the various software and hardware components, through which the business transaction is processed, located at the site of the service provider to determine if they function properly. In case of an outage 135 occurring at the database 130, such as a corrupted tablespace or a failure of the database runtime system, the task of the administrator 100 is to locate the cause of the outage, correct the problem and verify if the overall system is functioning properly again. It is to be understood that the invention is intended to operate with any form of outage or performance degradation.

The administrator 100 interacts with the software and hardware components either directly or through a management system that processes the administrative information (such as status and health data) exposed by software and hardware components at a well-defined management interface. In either case, it is important to note that the hardware and software components are perceived by the administrator as isolated resources and not as being part of an overall system serving a specific business purpose.

In particular, errors occurring in one component may not be noticed because the administrator does not become aware of them due to lack of continuous monitoring. In addition, absent the techniques of the invention, no explicit information regarding the interdependencies between the various components is available to an administrator in a straightforward way. Thus, it is possible that an error within a component, which is not continuously monitored may go unnoticed until the failure propagates to a monitored component.

In case of the aforementioned database outage 135, an administrator may eventually only become aware of the outage if the web application server 120 is not functioning properly anymore (for example, the load on the web application server increases drastically because it continuously retries to connect to the database server 125, and is unable to complete the requests sent by the client system 105). Thus, the administrator 100 would first examine the web application server 120, then determine if there is a network 123 connectivity problem and finally verify if the database server 125 is experiencing difficulties that might stem from an internal error in the database 130.

The client-server application architecture described above can be regarded as a precursor to an emerging computing environment referred to by IBM Corporation as an "autonomic" computing environment. P. Horn, "Autonomic Computing: IBM's Perspective on the State of Information Technology," IBM Research, October 2001, the disclosure of which is incorporated by reference herein, defines autonomic computing as a comprehensive and holistic approach to self-managed computing systems with a minimum of human interference. The term derives from the body's autonomic nervous system, which controls key functions without conscious awareness or involvement. More specifically, one of the goals of autonomic computing is to automate some or all of the tasks an administrator 100 would typically carry out. Motivation for doing so is as follows.

As computing evolves, the overlapping connections, dependencies, and interacting applications call for administrative decision-making and responses faster than any human can deliver. Pinpointing root causes of failures becomes more difficult, while finding ways of increasing system efficiency generates problems with more variables than any human can hope to solve. The problem of identifying and tracking dependencies between different systems of an autonomic computing environment may be characterized in the following way. Since a system can exist at many levels, an autonomic system needs detailed knowledge of its components, current status, ultimate capacity, and all connections with other systems to govern itself. Those skilled in the art will appreciate that the present invention may be performed in an autonomic computing environment.

Figure 2A:
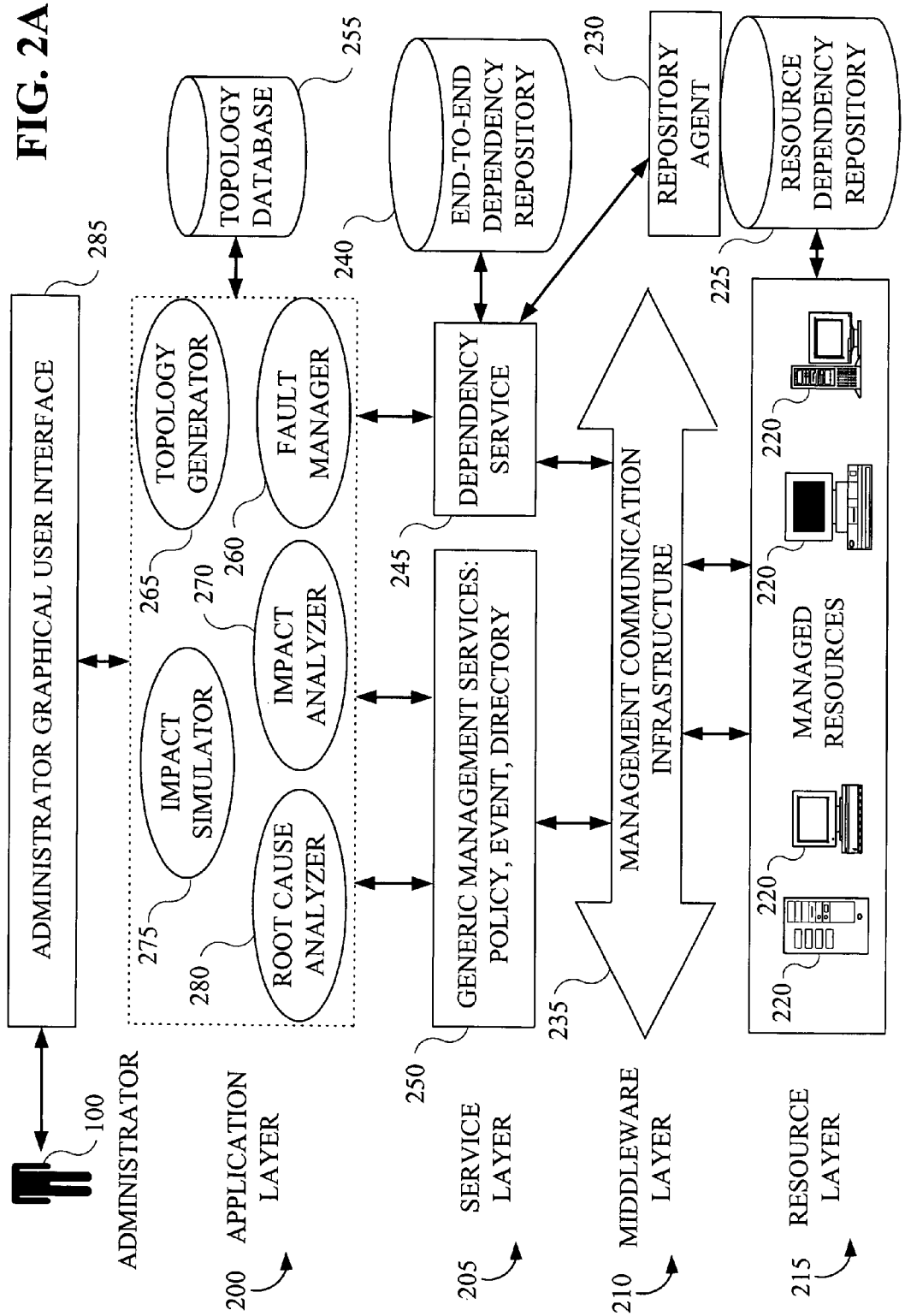
FIG. 2A is a block diagram illustrating a system for providing dependency management according to an embodiment of the present invention.

Referring now to FIG. 2A, a block diagram illustrates a system for providing dependency management according to an embodiment of the present invention. More specifically, FIG. 2A depicts a dependency management system that addresses the aforementioned issues. The system comprises four layers (application layer 200, service layer 205, middleware layer 210 and resource layer 215) and an administrator graphical user interface 285 by which an administrator 100 interacts with the system.

The lowest layer is the resource layer 215. The resource layer 215 comprises managed resources 220, a resource dependency repository 225 and a repository agent 230. Examples of managed resources 220 include, but are not limited to, physical and logical hardware components (examples of the former are hard disks, random access memory, central processing units, network adapters, channel controllers, etc.; examples of the latter are disk partitions, file systems, etc.) and software components (such as operating system, system services like print spoolers or name services, and end-user applications).

The resource dependency repository 225 contains the inventory of the hardware and software components of every managed resource 220 and the dependency information on a per-resource basis (i.e., the dependencies between the components within a managed resource 220). The resource dependency repository 225 can be either co-located with every individual managed resource 220 or reside at a centralized location. The resource dependency repository 225 can be queried, updated and modified through a repository agent 230, which makes the information of the resource dependency repository 225 available to other components of the system.

The middleware layer 210 comprises a management communication infrastructure 235 such as the protocols and object request brokers by which the different components of the system exchange (management) information.

The service layer 205 comprises various generic management services 250 such as policy, event and directory, which can be used by a variety of management applications. A specifically important service is the dependency service 245, which retrieves information, both from the managed resources 220 and from the repository agent 230, and processes this information to establish an end-to-end dependency model of the overall resource environment. This model (or parts of it) is stored in the end-to-end dependency repository 240, according to the needs (e.g., caching for faster retrieval) of the dependency service 245. Note that the dependency service 245 is the only component in the described system that directly interacts with the end-to-end dependency repository 240.

It is to be appreciated that the above-mentioned dependency model and its parts may be generated in accordance with the techniques disclosed in the above-referenced and concurrently-filed U.S. patent application identified by Ser. No. 10/241,162 entitled: "Methods And Apparatus For Managing Dependencies in Distributed Systems," some illustrative details of which are provided herein below. However, other model generation techniques may be employed.

The application layer 200 comprises various management applications that use the generic management services 250 and/or the dependency service 245. Examples of such management applications include, but are not limited to, fault manager 260, topology generator 265, impact analyzer 270, impact simulator 275 and root cause analyzer 280.

The root cause analyzer 280 determines the root cause of an outage (i.e., the component that initially caused the outage) based on traversing the dependency model (provided by the dependency service 245) from a component affected by an outage towards its antecedents. The root cause analyzer may employ the techniques disclosed in the above-referenced and concurrently-filed U.S. patent application identified by Ser. No. 10/241,213 entitled: "Methods And Apparatus For Root Cause Identification and Problem Determination in Distributed Systems." However, other root cause analysis techniques may be employed.

The impact analyzer 270 determines the impact of an outage (i.e., the components that are likely to be affected by the outage) based on traversing the dependency model (provided by the dependency service 245) from a component experiencing an outage towards its dependents. The impact analyzer may employ the techniques disclosed in the above-referenced and concurrently-filed U.S. patent application identified by Ser. No. 10/241,214 entitled: "Methods And Apparatus For Impact Analysis and Problem Determination."

The impact simulator 275, as will be described further herein, allows an administrator 100 to carry out a "what-if" analysis by simulating the affects of an outage of a specific component on the overall distributed environment. This enables the provisioning of appropriate failover solutions.

The fault manager 260 performs appropriate "sanity checks" or tests on components that have been identified either by the root cause analyzer 280 or the impact analyzer 270 as candidates for a failure. That is, the fault manager can perform such tests upon the direction of the root cause analyzer 280 or the impact analyzer 270 (i.e., serve as an interface for these modules), and report back results thereto. However, the root cause analyzer 280 or the impact analyzer 270 can perform their own tests independent of the fault manager.

It is to be understood that the fault manager is preferably comprised of a collection of application-specific or resource-specific tools that allow a determination to be made whether the component that is being tested is working properly or not. Thus, after testing the component with a related tool, the fault manager may return a message indicating whether the component "works" or "does not work." These tools may be automated and/or manual. By way of one automated example, a so-called "ping" program checks network connectivity. If the subject remote system answers to a ping, it is online and its network protocol stack (and all the underlying hardware, e.g., network adapter, cables, intermediate network components, etc.) works. If the remote system does not answer, it is known that at least something is wrong and another (set of) tool(s) may be employed to determine the problem. Thus, the fault manager may employ the ping program, as well as any number and type of other tools needed to test components of the distributed computing environment (e.g., heartbeat detection, status indication, etc.).

The topology generator 265 establishes (a subset of) the overall topology of a distributed system, comprising a vast amount of highly dynamic components, such as web applications, database instances and transactions. An example for using the topology generator 265 is to display the components of a distributed system that are involved in fulfilling the requests of a specific client system 105. The dependency model (or parts of it) is stored in the topology database 255, according to the needs (e.g., caching for faster retrieval) of the topology generator 265. Note that the topology generator 265 is the only component in the described system that directly interacts with the topology database 255. The topology generator may employ the techniques disclosed in the above-referenced and concurrently-filed U.S. patent application identified by Ser. No. 10/241,189 entitled: "Methods And Apparatus For Topology Discovery and Representation of Distributed Applications and Services." However, other topology generation techniques may be employed.

Figure 2B:
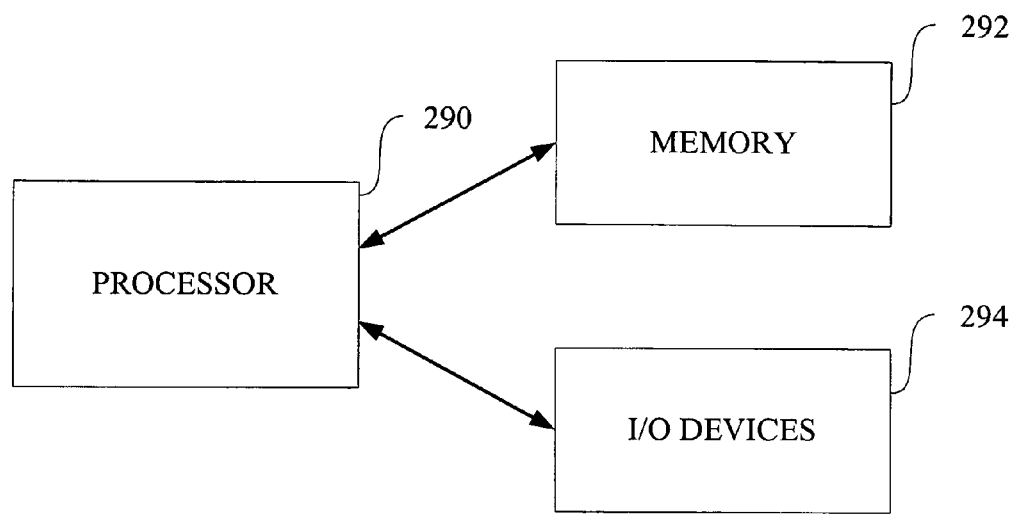
FIG. 2B is a block diagram illustrating a generalized hardware architecture of a computer system suitable for implementing a system for providing dependency management according to an embodiment of the present invention.

Referring now to FIG. 2B, a block diagram is shown illustrating a generalized hardware architecture of a computer system suitable for implementing the various functional components/modules of a system for providing dependency management as depicted in the figures and explained in detail herein. It is to be understood that the individual components of the dependency management system, namely, components associated with the graphical user interface 285, the application layer 200, the service layer 205 and the middleware layer 210 (FIG. 2A), may be implemented on one or more computer systems having an architecture as shown in FIG. 2B. The other components shown in FIG. 2A, e.g., the components associated with the resource layer 215, may also be implemented on similar computer systems.

As shown, the computer system may be implemented in accordance with a processor 290, a memory 292 and I/O devices 294. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard) for entering data to the processing unit, and/or one or more output devices (e.g., CRT display and/or printer) for presenting results associated with the processing unit.

It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 3:
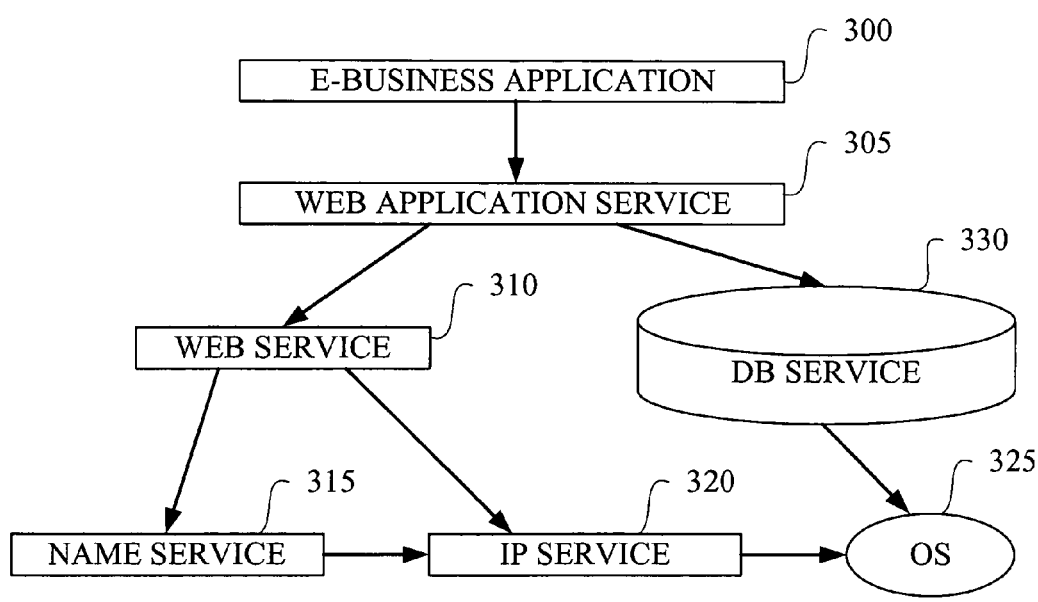
FIG. 3 is a block diagram illustrating a functional dependency model of services according to an embodiment of the present invention.

Referring now to FIG. 3, a block diagram illustrates a functional dependency model of services according to an embodiment of the present invention. More specifically, FIG. 3 depicts a functional application dependency graph between various components in an electronic commerce system such as the one depicted in FIG. 1. This functional dependency model represents both the functional components of a distributed system and their dependencies. Thus, the model defines dependencies between generic services, which are considered atomic from a business perspective. This implies that the functional model is not concerned with dependencies occurring within a business service. Such a decomposition makes sense in the scope of a specific product being used to implement the service and will be discussed in more detail with reference to FIG. 4.

Dependencies between components are depicted as arrows. An arrow always points from the dependent to the antecedent. Functional components are the (sub-) services that a service provider needs to deploy for providing an end-to-end service to a customer, the latter being defined in a service level agreement. The functional model focuses on the design of an end-to-end service and abstracts from the details of an end-to-end service's technical realization, such as the products being used for the service offering, their location (local or remote system), the provider domain (i.e., whether the provider itself outsources some of its services to another service provider, transparent to the customer), etc.

As shown, an e-business application 300 service depends on a web application service 305 for hosting the business logic. In order to function properly, the web application service 305 requires two further services. The static content of the electronic commerce website is provided by a web service 310, while a back-end database service 330 stores the dynamic content (such as product descriptions, user and manufacturer data, shopping carts, user profiles and preferences, payment information, etc.) of the e-business application 300 being offered to a customer. The web service 310 depends, itself, on two services, namely, the name service 315 for mapping host names to IP addresses, and the IP service 320 for network connectivity.

Recall that dependency relationships are transitive, i.e., the dependent of a given component requires, in addition to the component itself, also the components' antecedent(s). Consequently, in addition to the IP service 320 and the database service 330, all the depicted services require the presence of an operating system (OS) 325 service. For the sake of brevity, the dependency relationships of an OS 325 on hardware components is not depicted, although they are present in a functional model.

Figure 4:
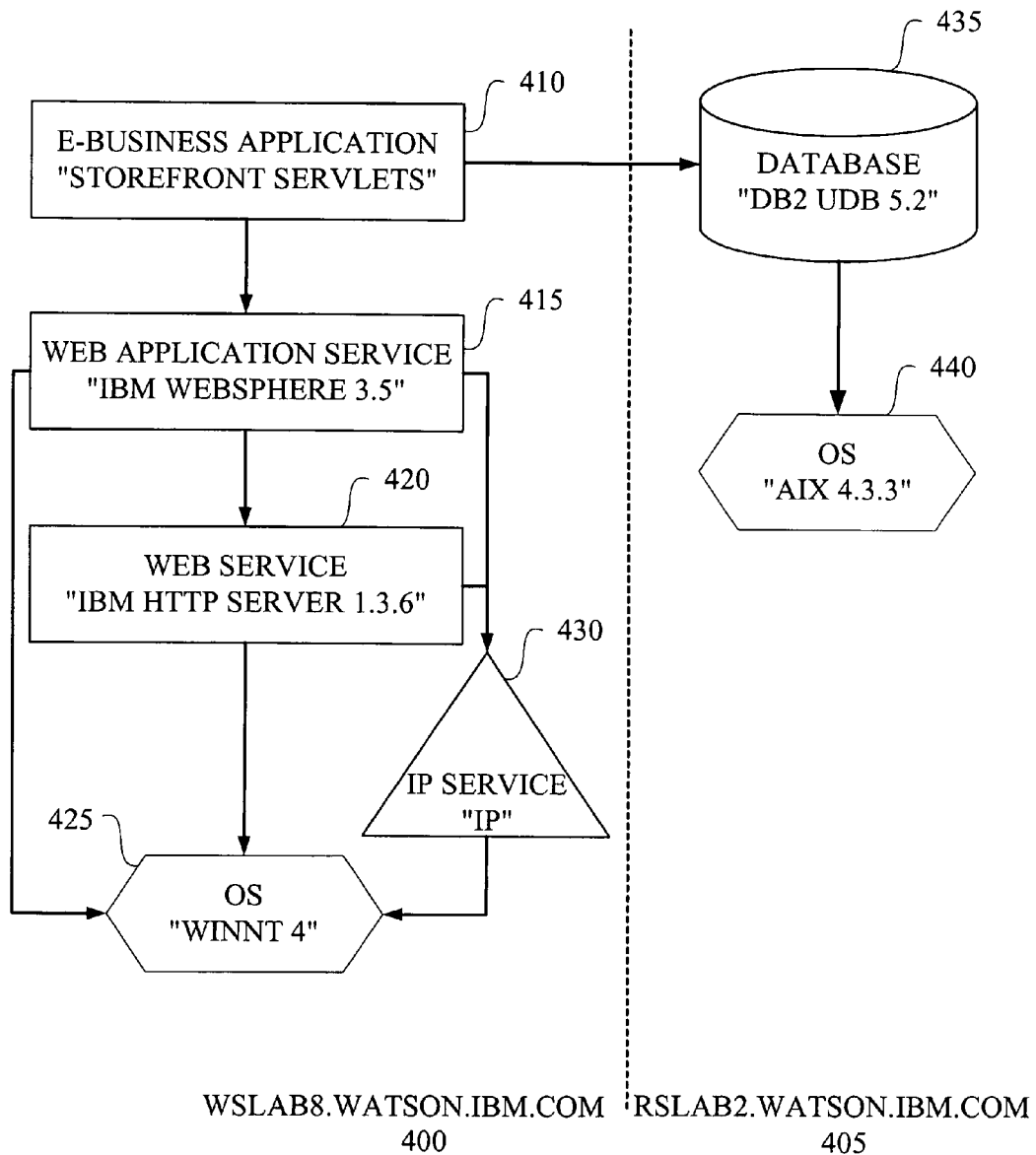
FIG. 4 is a block diagram illustrating a structural dependency model of services according to an embodiment of the present invention.

Referring now to FIG. 4, a block diagram illustrates a structural dependency model of services according to an embodiment of the present invention. More specifically, FIG. 4 depicts a structural application dependency graph between various components in an electronic commerce system such as the one depicted in FIG. 1.

This structural dependency model extends the functional model (FIG. 3) in the following ways. The structural dependency model deals with the implementation of a business service and is focused on concrete products and their logical (modules, components) and physical (files, shared libraries) architecture. The structural dependency model captures the detailed descriptions of software components, i.e., the system inventory, which is usually recorded in the various system repositories or in well-defined places, e.g., the configuration files of a managed resource 220.

Note that although the structural model deals with the components of a single system, it may maintain references to services and applications hosted by other systems, because the configuration files located on the system may contain this information. Examples of system repositories include, but are not limited to, the IBM AIX Object Data Manager (ODM), the Linux Red Hat Package Manager (RPM) or the Microsoft Windows Registry. Information relating to software components is typically captured during the installation and deployment of a software package. In addition, the structural model contains the dependencies between the various system components, depicted as arrows. For the sake of clarity, the names of the business services are written without quotes, while the names of the elements of the structural model are written with quotes in FIG. 4.

The system with the fully qualified domain name wslab8.watson.ibm.com 400 hosts the following components: the e-business application (a business service defined in the functional model), which is implemented as storefront servlets 410, the latter encapsulate the business logic of the application. The web application service is implemented by IBM WebSphere version 3.5 415, while the web service is realized by the IBM HTTP Server version 1.3.6 420. The IP service is implemented by the default IP protocol stack 430, the operating system (OS) is Win(dows) NT version 4 425.

The system with the fully qualified domain name rslab2.watson.ibm.com 405 hosts the following components: a database service implemented by (IBM) DB2 Universal Database (UDB) version 5.2 435, and an operating system, here (IBM) Advanced Interactive Executive (AIX) version 4.3.3 440.

Figure 5:
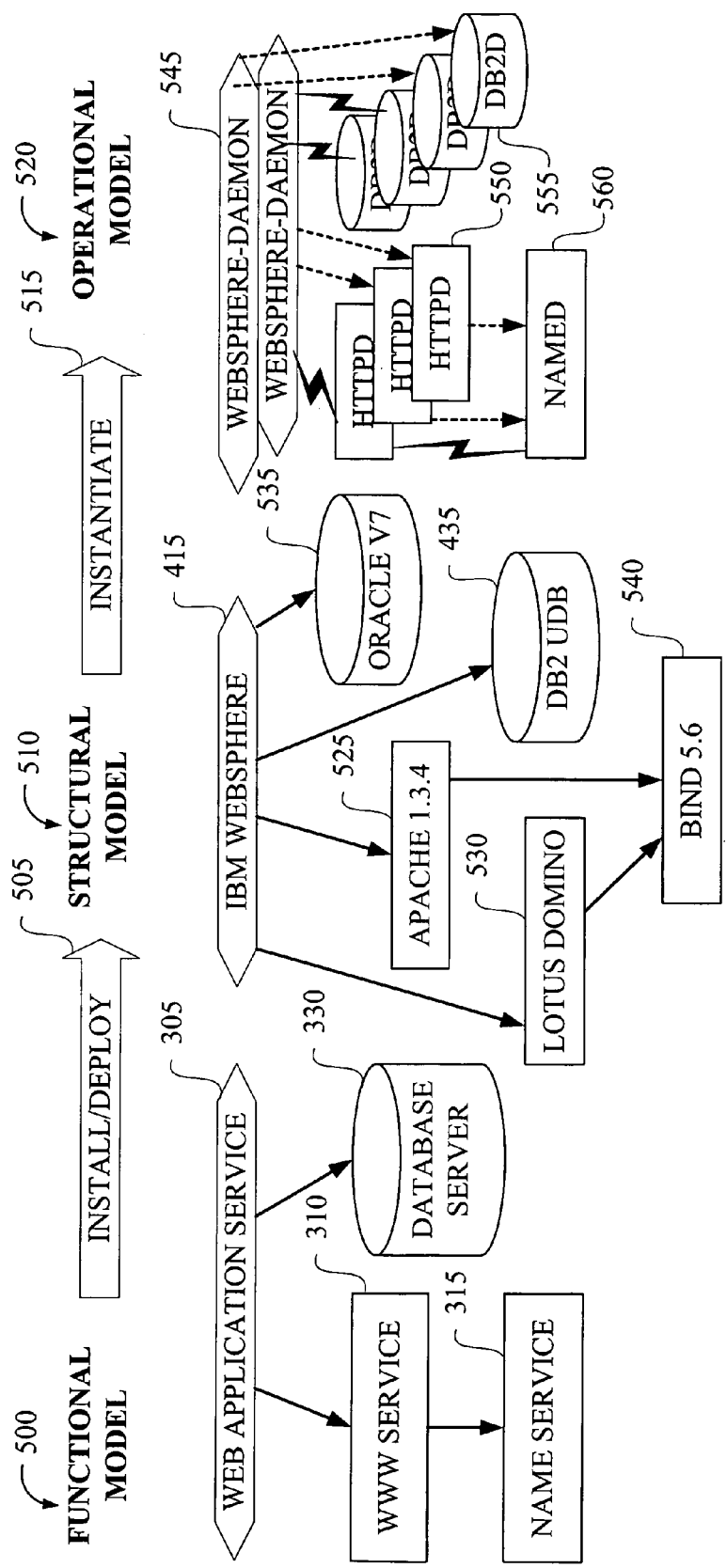
FIG. 5 is a block diagram illustrating a service lifecycle addressed by functional, structural and operational dependency models according to an embodiment of the present invention.

Referring now to FIG. 5, a block diagram illustrates a service lifecycle addressed by functional, structural and operational dependency models according to an embodiment of the present invention. More specifically, FIG. 5 depicts the relationships between a functional model 500 and a structural model 510, described above, and introduces a third dependency model, an operational model 520. These three models enable the invention to track the services during their whole lifecycle, i.e., from the design stage to the installation and deployment stage, to the operational or runtime stage.

As explained above, the functional model 500 relates to the design of the business services and is thus captured at the design time of a business system. Once the system described by the functional model 500 becomes instantiated or deployed (step 505), the structural model 510 is established. The operational model 520 is created when the various components of the structural model 510 become instantiated (step 515) and when runtime bindings between them are established. The operational model represents the characteristics of the previously described models at runtime. Several scenarios that illustrate the aforementioned concepts will now be described.

The web application service 305 is implemented by IBM WebSphere 415; one or more instances of the latter are referred to as websphere-daemon 545. Here, the web (or WWW) service 310 is implemented by two products, namely, Apache 1.3.4 525 and Lotus Domino 530. The running instances of these products can be identified as http daemons "httpd" 550. The database service 330 is implemented by two products, namely, Oracle v7 535 and DB2 UDB 435; however, no instances of Oracle v7 535 are active because no server processes are visible in the operational model 520. In contrast, four instances of DB2 UDB 435 are running, as can be seen from the presence of four DB2 daemons "db2d" 555 in the operational model 520. The name service 315 is implemented by BIND version 5.6 540; the running instance of BIND can be observed as "named" 560 in the operational model 520.

Note that the dependencies are propagated from the functional to the structural and the operational model. This is necessary because it is not possible to determine from a running application instance which other application instance(s) it requires to function properly.

Due to the short-livedness of some application instances, the operational model 520 is highly dynamic and potentially very large. In contrast to the functional and structural dependency models, the operational model 520 is not stored in a repository or a database, but computed on demand and to the extent needed.

Figure 6:
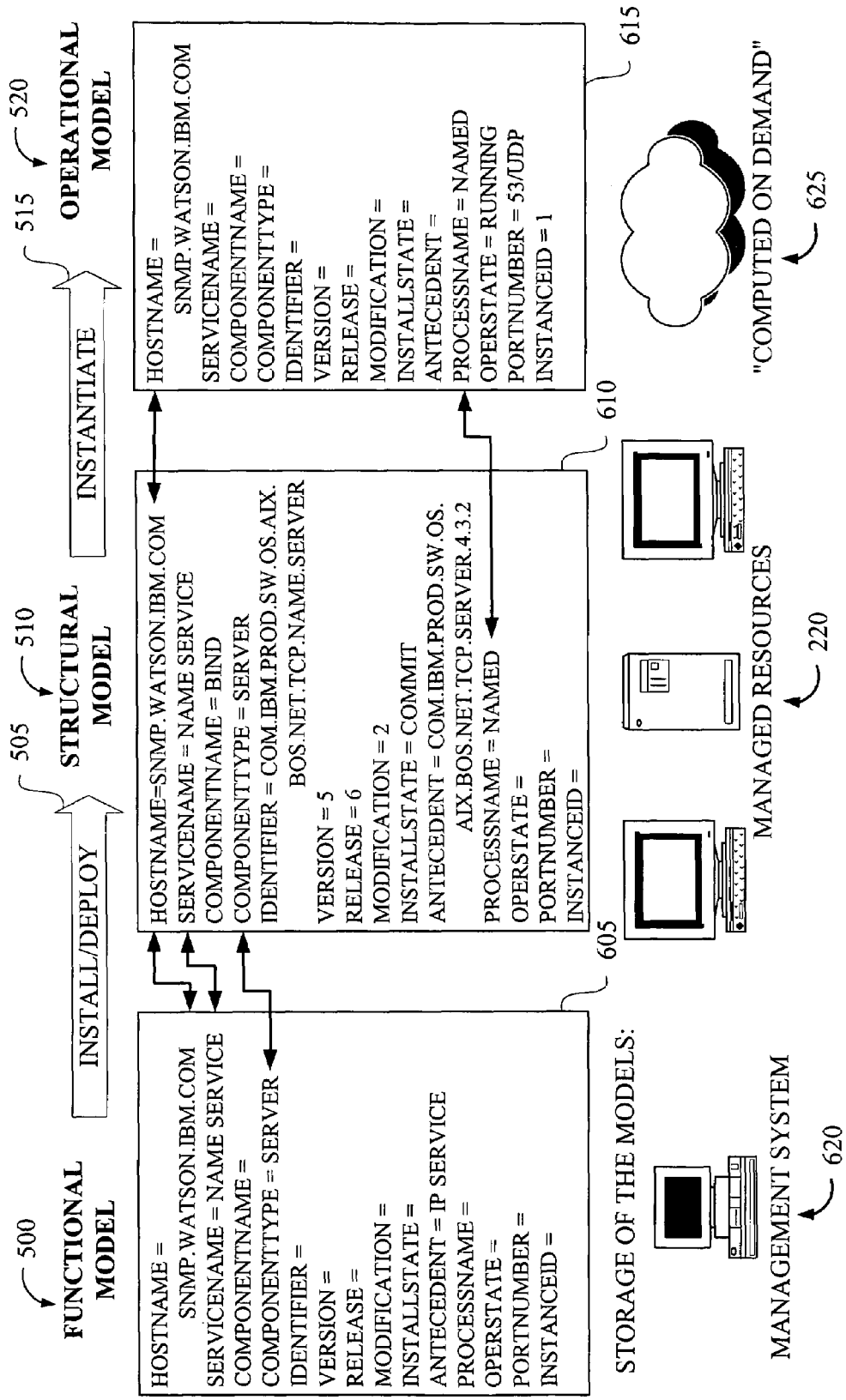
FIG. 6 is a block diagram illustrating relationships between functional, structural and operational dependency models according to an embodiment of the present invention.

Referring now to FIG. 6, a block diagram illustrates relationships between functional, structural and operational dependency models according to an embodiment of the present invention. More specifically, FIG. 6 depicts the details of the data template used for the three dependency models and the means for tying these models together by an example. The example details the template and its associated values for describing the name service during its lifecycle.

The functional template 605, used for the functional model 500 contains the "hostName" (the unique name of the computer system that hosts the service), the "serviceName" (name of the service) and the "componentType" (the role in which this service acts, i.e., client or server). With this information, a service can be uniquely identified within a distributed environment. However, further fields containing descriptive data (such as a description of the purpose of the service, the customer that subscribes to this service, etc.) may be added without departing from the spirit of the present invention. Finally, the "Antecedent" field contains the service(s) this service requires for proper functioning.

The structural template 610, used for the structural model 510, contains all the fields of the functional template 605, which allows to link the functional template 605 with the structural template 610 in order to navigate from the functional model 500 to the structural model 510, and vice-versa.

In addition, the structural template 610 contains the "componentName" (the name of the product component), an "identifier" (a globally unique name for identifying the component), the "version," "release" and "modification" (e.g., maintenance or patch/fix level) numbers, the "installState" (indicating whether the component has been successfully and completely installed) and "processName" (the name of the process(es) that identify this product component at runtime). Furthermore, the "Antecedent" field lists the component(s) this component requires to be operable.

The operational template 615, used for the operational model 520, contains the fields "hostName" (the unique name of the computer system that hosts the service) and "processName" (the name of the process(es) that identify the product component at runtime). These two fields link the structural template 610 with the operational template 615 in order to navigate from the structural model 510 to the operational model 520, and vice-versa. In addition, the operational template 615 contains the fields "operState" (the operational state of the process, i.e., running, interrupted, zombie, etc.), "portNumber" (the number of the TCP/UDP port by which an application can connect to the process), and, "instanceID" (to distinguish the various application instances within the scope of a computer system).

The three dependency models are stored and computed at different places to achieve a maximum degree of efficiency. The functional model 500 is gathered and stored at the management system 620, i.e., the central point of control by which the administrator 100 interacts with the distributed environment. Some of the reasons for this choice are as follows. As seen in the descriptions of FIG. 3 and FIG. 5, the functional model 500 is fairly compact because the amount of possible business services is limited. In addition, the functional model is not subject to overly frequent changes. The functional model is defined at the time when a business service is provided to a customer and remains unchanged until the service offering period ends. Since the administrator 100 is responsible for setting up and updating the functional model 500, it is a natural choice to keep it close to the management system 620.

As mentioned in the description of FIG. 4 and FIG. 5, the structural model 510, in contrast, captures the detailed descriptions of software components, i.e., the system inventory, which is usually recorded in the various system repositories or in well-defined places, e.g., the configuration files of managed resource 220. Consequently, it is both large sized (the content of a system repository tends to be between several hundred kilobytes and up to a few Megabytes) and also subject to frequent changes. Therefore, keeping the structural model 510 of a system at the managed resource 220, itself, eliminates both the communication overhead for updating the model and the need for vast amounts of storage that would occur if the structural models 510 of all managed resources (220) is stored at a centralized place.

The operational model 520 has been described in FIG. 5 as very dynamic and also extremely large because it covers potentially multiple instances of every application present on the computer systems of the distributed environment and the dependency relationships between them. Given the fact that current data centers of Internet/Application/Storage Service Providers and outsourcers consist of several thousands of computer systems with each hosting close to 100 applications and system services, an operational model comprising all the currently instantiated applications and their dependencies may be impractical. Thus, a practical approach is to compute the relevant parts of the operational model on demand (step 625). This is the purpose of the dependency service 245.

Figure 7:
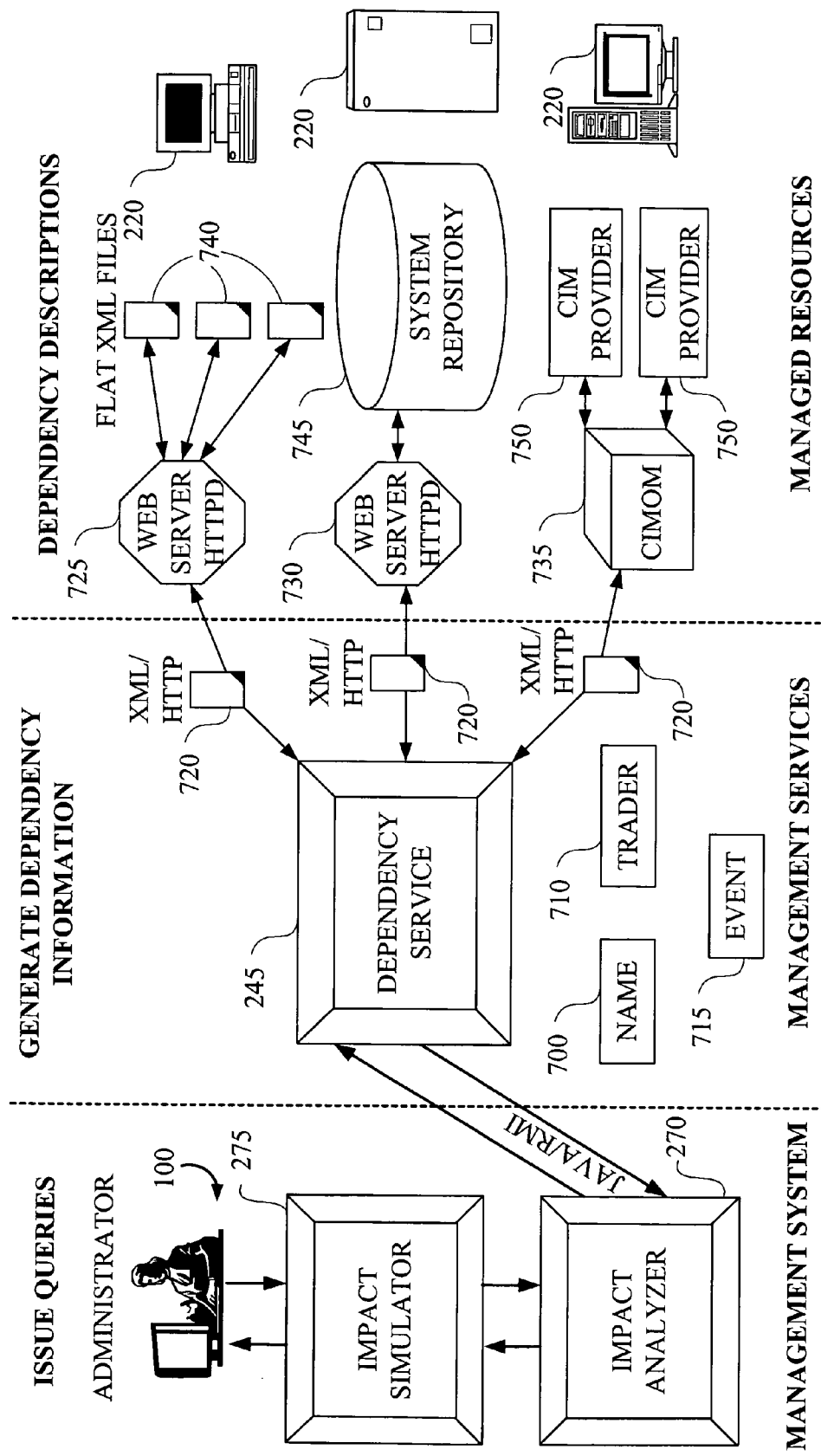
FIG. 7 is a block diagram illustrating components involved in analyzing and computing a potential impact of a service outage according to an embodiment of the present invention.

Referring now to FIG. 7, a block diagram illustrates components involved in analyzing and computing the potential impact of a service outage based on dynamic information technology (IT) service dependencies according to an embodiment of the present invention. More specifically, FIG. 7 depicts the data flows between the various components used for analyzing and computing such a potential impact. It is assumed that the managed resources 220 are able to provide XML (Extensible Markup Language) descriptions of their system inventory, configuration files and their various dependencies. However, it should be noted that any data description format may be used in accordance with the invention. The details on how this information can be acquired are as follows.

One straightforward way is to provide appropriate instrumentation within the system and its applications and services. This information is described in flat XML files 740 and made available to the other components of the system through a web server 725.

Alternatively, the dependency service 245 makes use of information stored in system repositories 745 for generating appropriate service dependency information. This information is made available to the other components of the system through a web server 730.

Third, the managed resources 220 expose their information by means of an instrumentation agent, called CIM (Common Information Model, which is a standardized management framework) provider 750, which interacts with a CIM Object Manager (CIMOM) 735, as proposed by the Distributed Management Task Force (DMTF). The CIMOM then exposes the necessary information to the interested components.

In the center of FIG. 7, various management services, being part of the service layer 205, are depicted. These are: a name service 700, a trader service 710, an event service 715 and the dependency service 245. The dependency service 245, triggered by queries of the administrator 100 through its management system or any management application located in the application layer 200 (such as the impact simulator 275 and the impact analyzer 270) using a communication protocol (e.g., Java Remote Method Invocation (RMI)), processes them and sends the results back to the impact analyzer 270 which, in turn, forwards the results for further processing to the impact simulator 275. Finally, the results are delivered to the administrator 100.

The main tasks of the dependency service 245 are as follows:

(a) Interacting with the management system or any management application located in the application layer 200. The management system issues queries to the application programming interface (API) of the dependency service (245).

(b) Expose a 'drill-down' method that, upon receiving the identifier of a service, returns:

(i) either descriptions of its direct antecedents, i.e., the first level below the node representing the service, or (ii) the whole subgraph below the node representing the service, (iii) an arbitrary subset of the dependency graph (levels m to n below a given node).

(c) Provide a 'drill-up' method with the same facilities, targeting the dependents of the service.

(d) Additional methods for gathering and filtering information for classes and properties of managed objects are present.

(e) Obtaining the dependency information from the managed resources 220 by issuing queries over http (HyperText Transport Protocol) and applying filtering rules (as specified by the administrator 100) to it.

(f) Combining the information into a data structure that is sent back to the management system as XML document.

As mentioned above, due to its fully distributed nature, the invention aims at keeping the load on every involved system as low as possible. The invention decouples the management system from the managed resources 220 and encapsulates the time consuming filter and join operations in the dependency service 245, which can be replicated on various systems. It is therefore possible to achieve a maximum level of parallelism for query operations, since the selection of an instance of the dependency service 245 can be done flexibly by the management system.

Another important advantage is that the (very large and highly dynamic) operational model 520 is not stored at a specific place but computed on demand in a stepwise manner. The different parts of the structural model 510 are stored at the managed resources 220. The management system therefore always receives the most recent information but is still free to store it according to elaborate caching policies.

Figure 8:
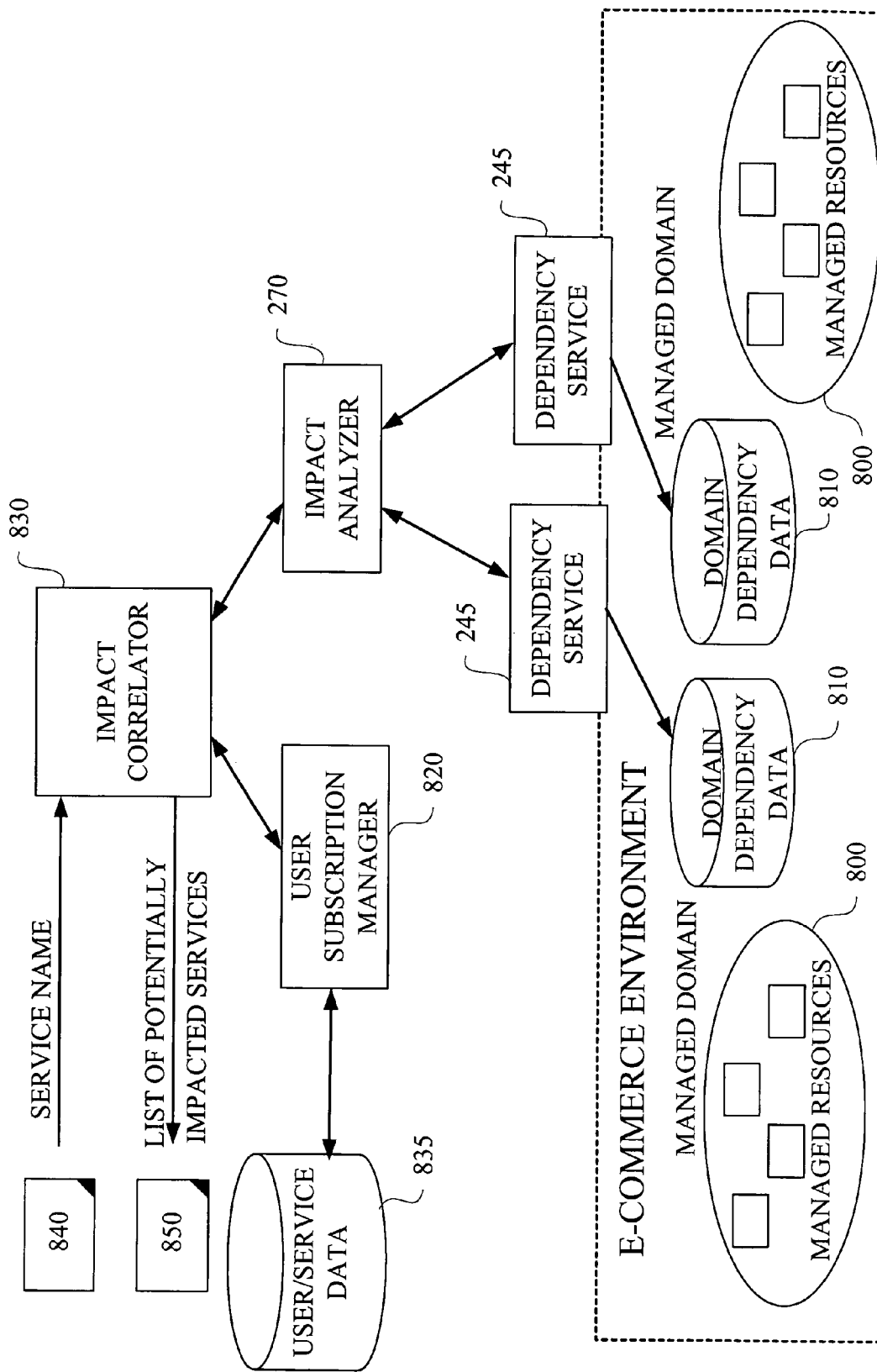
FIG. 8 is a block diagram illustrating components of an impact simulator and vulnerability analyzer according to an embodiment of the present invention.

Referring now to FIG. 8, a block diagram illustrates components of an impact simulator according to an embodiment of the present invention. As shown, an impact correlator 830, which functions as a flow coordinator for the entire impact simulation process, receives service problem reports 840 from the administrator 100, containing the name of the service and the host name (and eventually other parameters, as will be specified in FIG. 14) for which the impact of its outage (or degradation) is to be simulated. The impact correlator 830 interacts with the impact analyzer 270 (preferably, as described in the above-referenced U.S. patent application identified by Ser. No. 10/241,214 and, in turn, with the dependency service 245, in order to obtain a list of the higher-level services which depend on the service in question. Examples of higher-level services would be: electronic mail service, web service, etc.

The task of the dependency service 245 is to find the dependents of the service in question, even if the e-commerce environment spans different managed domains 800. In order to deal with multiple domains, various (cascaded) instances of the dependency service 245 may work jointly together. In FIG. 8, the e-commerce environment is shown by the dotted rectangle. Typically, such environments contain one or more managed domains, eventually each with its own dependency database 810 and dependency service 245.

The dependency service 245 returns the names and identifiers of the dependents back to the impact analyzer 270, which then forwards the results to the impact correlator 830 for further processing. This processing may include the calculation of the likelihood of a failure, or the filtering of the obtained results according to the parameters specified in the request 840, such as whether only direct dependents are to be reported, or only dependents that exceed a certain threshold with respect to their likelihood of failure.

If the request 840 asks for the users that may be affected by the outage of a service (see the description of the APIs in FIG. 14), the impact correlator 830 verifies which users have subscribed to any dependent service. This is done for every dependent service by querying the user subscription manager 820 for subscribed users. The user subscription manager 820 relies, for this computation, on a user/service database 835, which contains a mapping between registered users and the services to which they subscribed.

If the request 840 asks for the names of the host systems that may incur an outage of one of their hosted services (see the description of the APIs in FIG. 14), the impact correlator 830 determines the host names in a straightforward way because the dependency service 245 and the impact analyzer 270 return the name of a service in the form of a uniform resource identifier (URI), which contains, by definition, both the service and host name. The impact correlator 830 thus extracts the host name (which is the prefix of the overall URI), and verifies whether this specific host name already appears in its list of results for eliminating duplicates. After the dependent services that are likely to be affected by an outage have been narrowed down to the smallest possible set of services and resources, the impact correlator 830 returns this information 850 to the administrator.

Figure 9:
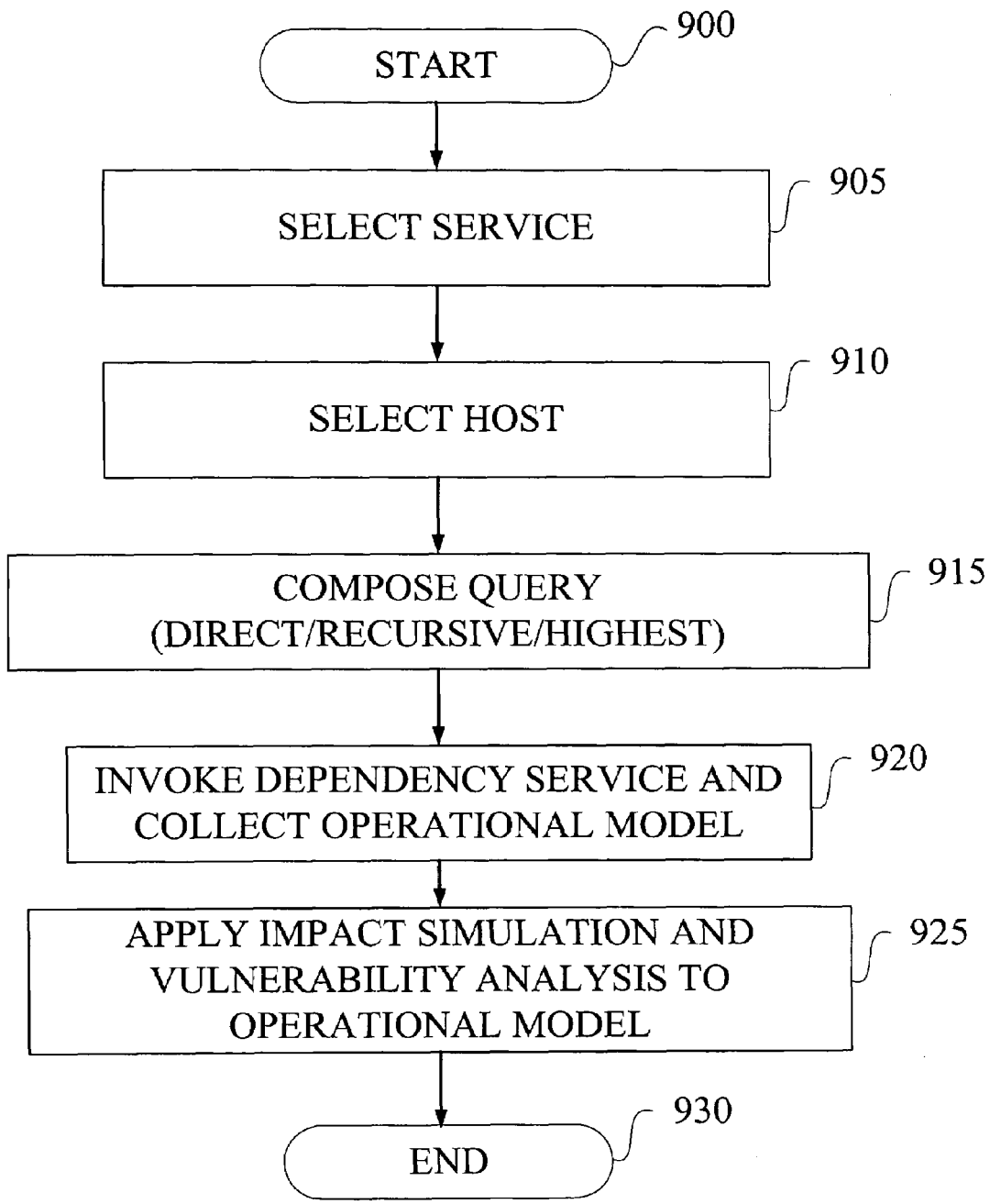
FIG. 9 is a flow diagram illustrating steps for invoking a dependency service and performing impact simulation and vulnerability analysis on an operational model according to an embodiment of the present invention.

Referring now to FIG. 9, a flow diagram illustrates steps for invoking a dependency service and performing impact simulation and vulnerability analysis on an operational model according to an embodiment of the present invention. More specifically, FIG. 9 depicts a methodology of invoking a dependency service (e.g., dependency service 245), collecting its results, and applying impact simulation and vulnerability analysis to them. This methodology is initiated either by an administrator 100 or a management application.

The methodology begins at block 900 and proceeds as follows. First, a business service is selected (step 905), typically from the functional model, since an administrator is interested in the business services provided by the distributed system. Upon selection of a business service, the structural model is queried to provide a selection of hosts that are involved in the provisioning of the business service. This can be either done by locating the structural models present on every host of the distributed system, or (for efficiency purposes) by querying a (periodically updated) service/host lookup table stored at the management system, which contains a mapping between the services and hosts present in the distributed system. The administrator then selects a host at his discretion (step 910).

In addition, the administrator composes a query (step 915). Examples of query parameters include, but are not limited to, the direction of the traversal (towards the service dependents, or towards its antecedents), the depth of the traversal (e.g., only the immediate antecedents/dependents; the overall possible antecedents/dependents, i.e., the complete transitive closure of the operational model; only between the m-th and n-th layers of the operational model), filtering criteria related either to the presence of attributes or to their values.

The fact that the order of the steps for selecting service (step 905), host (step 910) and the options for composing the query is prescribed here, emphasizes the "service-centric" approach (versus the "host-centric" approach of existing art) of the present invention. However, one having skill in the relevant art will recognize that modifications in the order of steps (steps 905, 910 and 915) may be made without departing from the spirit and scope of the present invention.

Examples of such modifications are: to offer the user (e.g., by means of a graphical user interface) the choice of performing the three steps of the selection process in an arbitrary order; allowing at first the selection of a host and then looking up the services present on that host by means of querying the structural model, thereby restricting the possible service candidates for selection.

After the service and host selection and the composition of the query, the dependency service is invoked (step 920) with these parameters. Note that the mode of invocation can be either synchronous (i.e., blocking the invoker until the results are returned by the dependency service) or asynchronous (thus allowing the invoker to perform additional tasks during the computation).

The dependency service computes the appropriate part of the operational model and, depending on the mode of invocation, either sends the results back to the invoker or notifies the invoker that the results are available. The invoker then collects the results and applies impact simulation and vulnerability analysis to them (step 925). The methodology ends at block 930.

Figure 10:
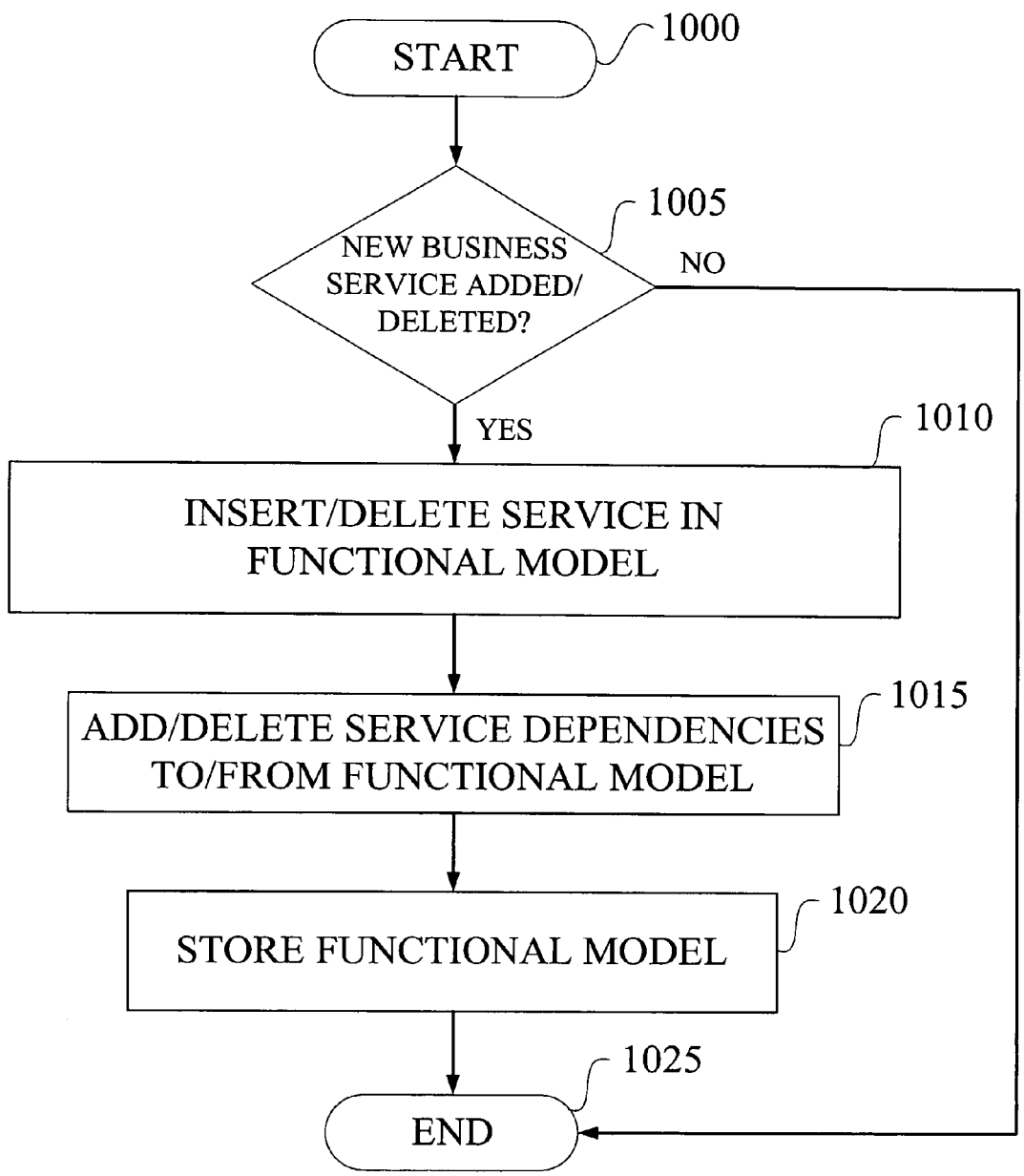
FIG. 10 is a flow diagram illustrating tasks of an administrator for creating and updating a functional dependency model according to an embodiment of the present invention.

Referring now to FIG. 10, a flow diagram illustrates tasks of an administrator for creating and updating a functional dependency model according to an embodiment of the present invention. This is necessary either if new (business) services are deployed and offered, or changes are applied to an existing model, or existing (business) services are withdrawn from an offering.

The methodology begins at block 1000 and proceeds as follows. An administrator or a management application evaluates whether a new business service should be added or an existing service is to be deleted (step 1005). If this is not necessary, the methodology proceeds directly to block 1025. Otherwise, in step 1010, the service and its description are entered in (or removed from) the template 605 of the functional model, which has been described in FIG. 6.

Then, in step 1015, the service dependencies, i.e., its relationships regarding its antecedents, need to be added to (or removed from) the template 605 of the functional model. In case of a deletion, note that the dependencies from the service dependents need to be adjusted to point to the antecedents of the service that is to be removed. This may involve checking for eventual duplicate descriptions within the dependencies of the antecedents. Finally, the updated functional model is stored in the repository of the management system (step 1020). The methodology ends at block 1025.

Figure 11:
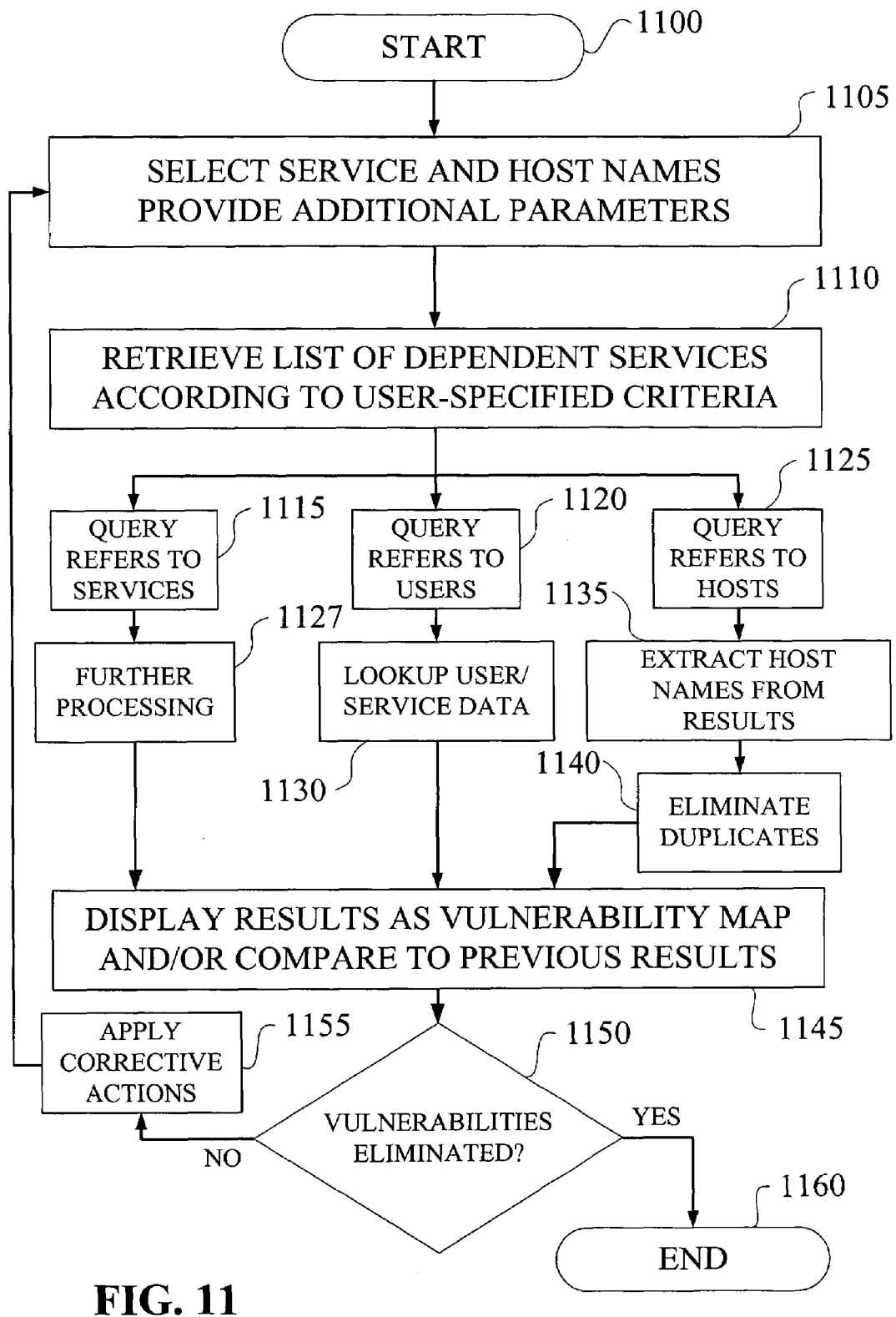
FIG. 11 is a flow diagram illustrating administrative procedures for eliminating vulnerabilities of a distributed computing environment based on impact simulation and vulnerability analysis according to an embodiment of the present invention.

Referring now to FIG. 11, a flow diagram illustrates administrative procedures for eliminating vulnerabilities of a distributed environment based on impact simulation and vulnerability analysis according to an embodiment of the present invention. The methodology begins at block 1100 and proceeds as follows.

An administrator 100 selects a specific service (e.g., electronic mail service) on a specific host system and provides additional processing instructions in the form of input parameters (step 1105). The impact simulation is started with querying the system for the dependent services, according to the criteria specified by the administrator (step 1110). This is carried out by invoking the impact analyzer 270 and the dependency service 245 from the impact simulator 275, and by retrieving the results.

Different procedures are applied according to the purpose of the query. An administrator can either be interested in the services that are likely to be affected by an outage of the service in question (block 1115), or in the end users (block 1120), or in the host systems that host various dependent services (block 1125). In the first case, the impact simulator returns a list of services that would actually be impacted by the outage of this specific service. Further processing of the response may be necessary (step 1127), such as computing the probabilities of an outage according to the weights of the dependencies.

In the second case, the impact simulator returns a list of users that would actually be impacted by the outage of this specific service. Since the impact simulator receives a list of services, it maps the services to the users who have subscribed to these dependent services by performing a lookup in the user/service database (step 1130).

In the third case, the impact simulator returns a list of host systems whose services would actually be impacted by the outage of this specific service. Since both the dependency service 245 and the impact analyzer 270 return a URI which contains, by definition, both the service and host name, the impact simulator determines the host names in a straightforward way. The impact simulator (275) thus needs to extract the host name (which is the prefix of the overall URI) (step 1135), and verifies whether this specific host name already appears in its list of results for eliminating duplicates from the result (step 1140).

After these steps have been performed and depending on whether the administrator is interested in services, users or host systems, the results are sent back to the administrator. The administrator may use a graphical user interface that depicts a map of the components of the distributed environment, together with their dependencies. In this case, the results of the impact simulator are used to highlight the impacted services (or users or host systems), e.g., by displaying the corresponding icons in a specific color (step 1145). Alternatively (or in addition to the graphical representation), an administrator may choose to compare the list of results with the results of a previous impact simulation to determine whether the vulnerabilities of the previous run still exist (step 1150).

If vulnerabilities exist that need to be eliminated, an administrator would apply corrective actions in a subsequent step (such as deploying a backup e-mail server or an appropriate failover solution) (step 1155). In order to verify whether these corrective actions have been successful, the administrator runs the impact simulator again (return to step 1105) and compares the results with the outcome of the previous impact simulation (in step 1145).

If the list of results returned by the second run is significantly smaller (or even empty), the administrator has successfully removed a source of vulnerability from his distributed environment. The methodology ends at block 1160.

It should be noted that the invention may be extended by enabling the administrator to add synthetic or virtual services, users and host systems (i.e., components that have no "real" counterparts in the actual distributed environment) in order to obtain a solid basis for planning purposes without having the need to deploy actual "real" components. One having skill in the relevant art will recognize that such modifications and extensions may be made without departing from the spirit and scope of the invention.

Figure 12:
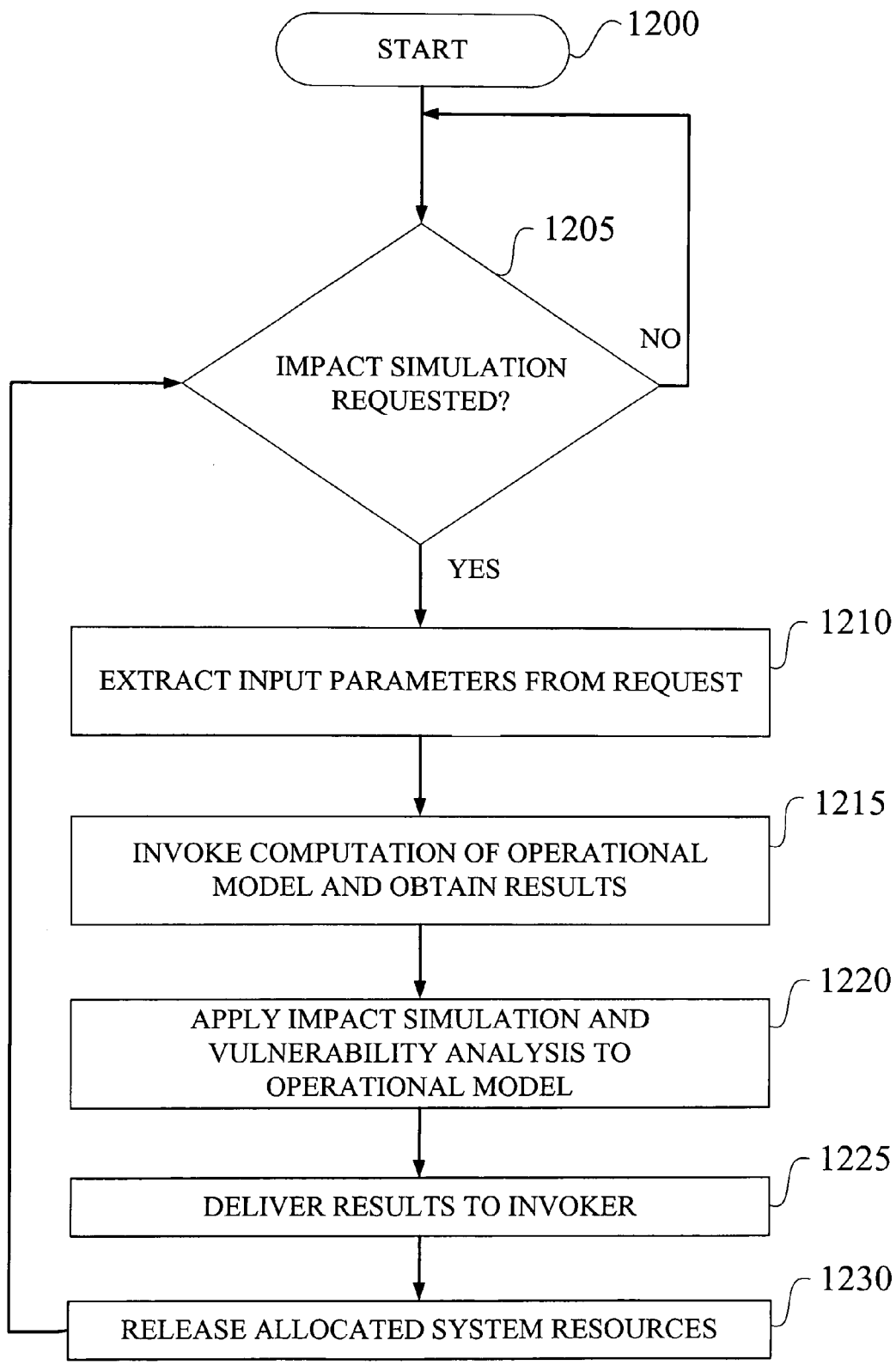
FIG. 12 is a flow diagram illustrating performance of impact simulation and vulnerability analysis on an operational model according to an embodiment of the present invention.

Referring now to FIG. 12, a flow diagram illustrates performance of impact simulation and vulnerability analysis on an operational model according to an embodiment of the present invention. The methodology begins at block 1200 and proceeds as follows. The system performing the simulation and analysis on the operational dependency model is continuously listening for requests at a specific port of the host on which the system is executed, which is illustrated by the loop that connects step 1205 with itself. This is the standard behavior for server processes ("daemons") that implement services, which can be invoked by applications at any time.

On reception of a request, the system extracts the input parameters from the request (step 1210). As mentioned in the description of FIG. 9, examples of input parameters include, but are not limited to, the names of the service and the host in question, the direction of the traversal, the depth of the traversal, filtering criteria related either to the presence of attributes or to their values. These input parameters are then used to invoke the computation of the operational model, which is invoked in step 1215.

In addition, the results of the computation, i.e., the operational model, are gathered. The impact simulation and vulnerability analysis is then performed on the operational model (step 1220). The results of the impact analysis are returned to the invoking application, in accordance with the mode of invocation specified at the time of the invocation (step 1225). After this step, any allocated resources of the host on which the system is running are released (step 1230). Examples of host resources include, but are not limited to, memory, disk space or CPU registers. Finally, the system returns back to its initial stage and listens for subsequent incoming requests (return to step 1205).

Figure 13:
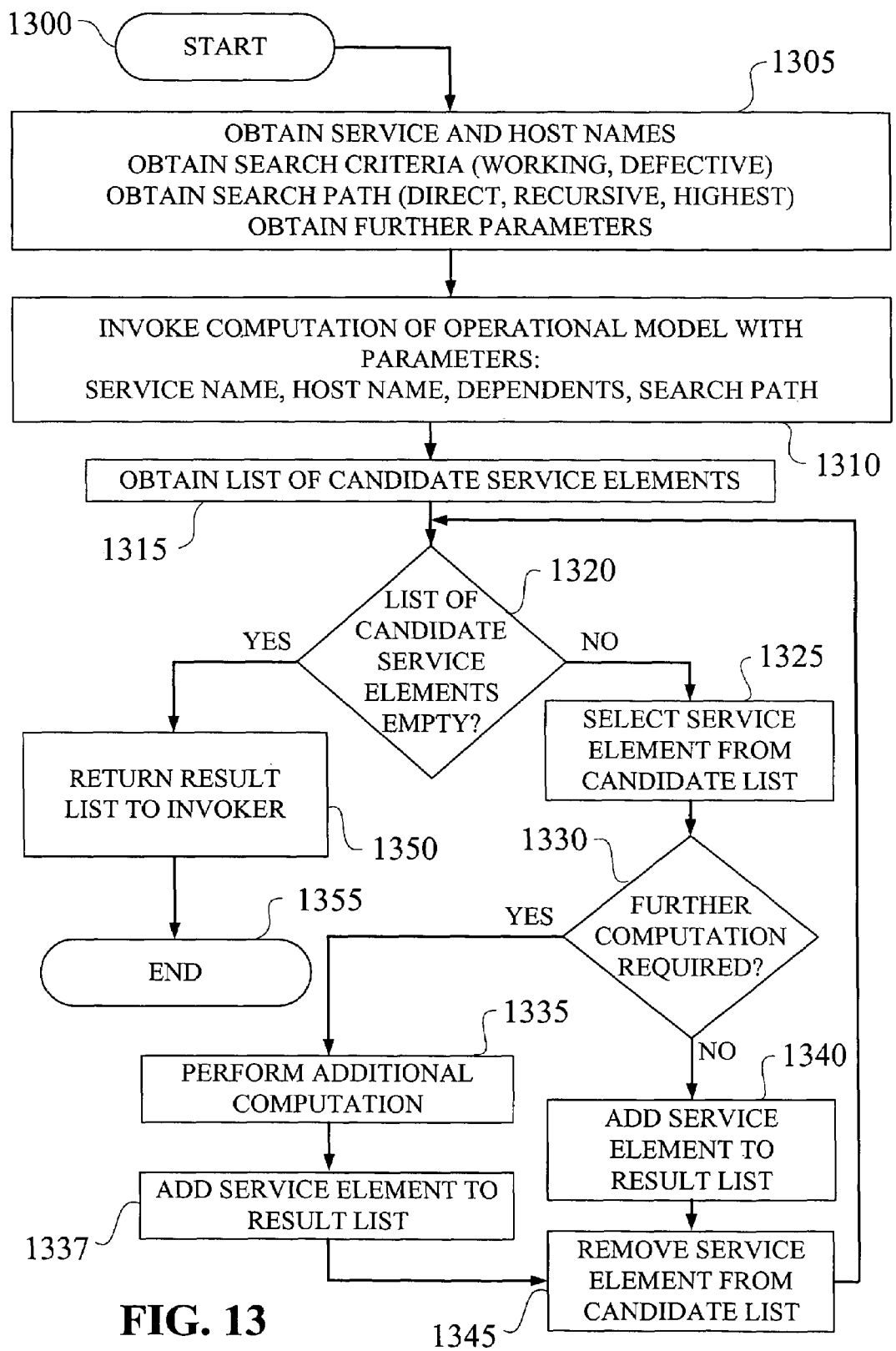
FIG. 13 is a flow diagram illustrating performance of impact simulation and vulnerability analysis on dependents of a service according to an embodiment of the present invention.

Referring now to FIG. 13, a flow diagram illustrates performance of impact simulation and vulnerability analysis on dependents of a service according to an embodiment of the present invention. The methodology begins at block 1300 and proceeds as follows.

First, the names of the targeted service and the host are obtained, together with various other, user-defined parameters (step 1305). These parameters are provided by the invoking management application, which obtains these parameters either directly from the administrator or from an event message that arrives at the management console. In addition, the search criteria according to the status of the dependents are specified. They indicate whether the system should return the services that have encountered a problem ("defective") or the services that perform well. Usually, a management application is interested in the former, i.e., the defective services. Furthermore, the search path is specified. A management application can be either interested in the direct dependents of a service (search path length=1), the whole set of services that depend directly (or indirectly) on the service (search path=recursive), or the highest level of the dependents, i.e., the higher-level (end-user) services that depend on the service in question (search path=max).

Then, the computation of the operational model is performed by the dependency service, according to the parameters "Service Name," "Host Name," "Dependent status," "search path" (step 1310). Next, in step 1315, the results, i.e., the list of dependent service elements ("Candidate List"), are obtained from the dependency service.

The following steps are performed until the list of candidate service elements is empty (1320):

The first service element of the candidate list is selected (step 1325) and checked to determine whether further computation is needed (step 1330). Further computation may involve the computation of failure likelihood, lookup of users subscribed to dependent services, or obtaining the host names from the returned URIs. The steps of this procedure are described above in detail in the context of FIG. 8. If further computation is needed, this is carried out (in accordance with the initial request) by the impact simulator (step 1335). Finally, the service name (and further information, according to the request) is added to the result list (step 1337).

If, however, it turns out that no further computation is needed, the service name is directly added to the result list (step 1340). Finally, the service element in question is removed from the input service elements list (step 1345) and the methodology proceeds back to step 1320. If the list of service elements is empty, the methodology then proceeds directly to step 1350, where either the list of working service elements is returned to the invoker, or the list of defective service elements. The result content depends on the specifics asked for by the invoker in step 1305. The methodology ends at block 1355.

The steps of this status check procedure are described in detail in FIG. 14. If the service element in question is functioning properly (status="OK"), it is added to the list of working service elements, i.e., an "OK" list (step 1335). If, however, it turns out that the service element is experiencing a problem, it is added to the "defective" list (step 1340). Finally, the service element in question is removed from the candidate service elements list (step 1345) and the methodology proceeds back to block step 1320.

If the list of candidate service elements is empty, the methodology then proceeds directly to step 1350, where either the list of working service elements or the list of defective service elements is returned to the invoker. The results content depends on whether the invoker has been asking in step 1305 for working or defective services. The methodology ends at block 1355.

Referring now to FIG. 14, examples are depicted of impact simulation application programming interfaces (APIs) according to an embodiment of the present invention. The table includes base APIs that can generate, send and request receipt of appropriate operational models for a given service and host name. Those skilled in the art will appreciate that the APIs can use one or more parameters (not shown) to identify characteristics (specified in the functional description) used by the APIs.

Specifically, the "getImpactedDirectDependents(parameters)" API retrieves direct dependents (services located one level above the service in question) that are likely to be affected by an outage of a service located on a specific host.

The "getImpactedDependentsRecursive(parameters)" API performs a recursive "drill-up," i.e., the API retrieves all the dependents of a given service, which is located on a specific host. The API therefore returns all the services residing "above" a given service in the dependency hierarchy that are likely to be affected by an outage.

The "getImpactedHighestDependents(parameters)" API retrieves the highest dependents of a service located on a specific host that are likely to be affected by an outage. This API yields the services that do not have any dependents themselves (i.e., they reside in the highest layer of the dependency hierarchy of a given service). This API is particularly useful if a user or management application wants to determine quickly whether any "end-user" service (e.g., electronic mail service or web service) may be affected by an outage without having to deal with "intermediate" services.

The "getImpactedUsers(parameters)" API retrieves all user-identifiers that have subscribed to a dependent of a service located on a specific host. These users are therefore likely to be affected by an outage.

The "getImpactedHosts(parameters)" API retrieves all the host names of the systems that host a dependent of a service located on a specific host. These hosts are therefore likely to experience an outage of one or more hosted services.

The "getImpactedTopNDependents(parameters)" API retrieves the dependents that are mostly impacted (according to weight of dependencies) by an outage; n specifies the maximum number of items to be retrieved. This API assumes the presence of weights being attached to every dependency, indicating the degree of likelihood that this service fails if its antecedent experiences an outage. In addition, an administrator is able to customize the results by indicating the maximum number of results returned.

For example, an administrator may ask for the top ten dependent services that may fail with at least 75% likelihood if a specific service located on a specific host faces an outage. The API will then return a list with a maximum of ten tuples (comprising a service identifier and its likelihood of failure), in reverse order of their likelihood of failure, which are greater than or equal to 75% (e.g., [Service A, 98%]; [Service B, 82%]; [Service C, 79%]; [Service D, 75%]). Note that the location of the dependents (whether direct, indirect, or highest) does not play a role for this API.

The "getImpactedTopNHighestDependents(parameters)" API retrieves the highest dependents that are mostly impacted (according to weight of dependencies) by an outage; n specifies the maximum number of items to be retrieved. This API assumes the presence of weights being attached to every dependency, indicating the degree of likelihood that this service fails if its antecedent experiences an outage. In addition, an administrator is able to customize the results by indicating the maximum number of results returned.

For example, an administrator may ask for the top ten highest dependent services that may fail with at least 75% likelihood if a specific service located on a specific host faces an outage. Note that the location of the dependents plays a role for this API because the API only focuses on the highest layer of services in an operational dependency model, i.e., this API yields the services that do not have any dependents themselves (i.e., they reside in the highest layer of the dependency hierarchy of a given service). This API is particularly useful if a user or management application wants to determine quickly which "end-user" services (e.g., electronic mail service or web service) are most likely to be affected by an outage.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method for determining a potential impact of a simulated condition of at least one subject component associated with a computing environment, the method comprising the steps of:
    identifying one or more components in the computing environment which depend on the at least one subject component;
    determining a potential condition status of a simulated condition associated with each of the one or more identified components; and
    presenting information to a user with respect to at least a portion of the one or more identified components based on the corresponding condition status.

2. The method of claim 1, wherein the computing environment comprises a distributed computing environment.

3. The method of claim 1, wherein the computing environment comprises an autonomic computing environment.

4. The method of claim 1, wherein the information presented to the user comprises a representation of a vulnerability associated with at least a portion of the one or more identified components based on the corresponding condition status.

5. A computer-based method for determining a potential impact of a simulated condition of at least one subject component associated with a computing environment, the method comprising the steps of:
    identifying one or more components in the computing environment which depend on the at least one subject component;
    determining a potential condition status of a simulated condition associated with each of the one or more identified components; and
    presenting information to a user with respect to at least a portion of the one or more identified components based on the corresponding condition status;
    wherein the information presented to the user comprises a representation of a vulnerability associated with at least a portion of the one or more identified components based on the corresponding condition status, and further wherein the representation comprises a vulnerability map indicating a respective likelihood of failure associated with each of the one or more identified components.

6. The method of claim 1, wherein the information presented to the user comprises at least one of a list of potentially affected end-users, a list of potentially affected components and a list of potentially affected hosts.

7. The method of claim 1, wherein the information presented to the user comprises a comparison of one determination of the potential impact of the simulated condition of the at least one subject component to at least one other determination of the potential impact of the simulated condition of the at least one subject component, such that the user is able to verify whether one or more steps taken, between the one determination and the at least one other determination, to at least minimize the potential impact are substantially effective.

8. The method of claim 1, wherein the at least one subject component is an existing component in the computing environment.

9. The method of claim 1, wherein the at least one subject component is not an existing component in the computing environment.

10. A computer-based method for determining a potential impact of a simulated condition of at least one subject component associated with a computing environment, the method comprising the steps of:
    identifying one or more components in the computing environment which depend on the at least one subject component;
    determining a potential condition status of a simulated condition associated with each of the one or more identified components; and
    presenting information to a user with respect to at least a portion of the one or more identified components based on the corresponding condition status;
    wherein the identifying step further comprises traversing at least a portion of a model representative of an existence of one or more relationships associated with at least a portion of components of the computing environment and which is capable of accounting for a full lifecycle associated with at least one component of the computing environment.

11. The method of claim 10, wherein the model is in a form comprising a functional categorization, a structural categorization and an operational categorization.

12. The method of claim 11, wherein the identifying step further comprises computing the operational categorization of the model based on at least one input criterion and traversing the operational categorization to identify the one or more components in the computing environment which depend on the at least one subject component.

13. The method of claim 12, wherein the at least one input criterion comprises at least one of a name of the at least one subject component, a host associated with the at least one subject component, a direction of the traversal, a depth of the traversal, a path of the traversal and at least one filtering criterion.

14. The method of claim 1, wherein the condition of the at least one subject component is one of failed, not failed and degraded.

15. The method of claim 1, wherein a component is one of a service, an application, middleware, hardware, a device driver, an operating system and a system associated with the computing environment.

16. Apparatus for determining a potential impact of a simulated condition of at least one subject component associated with a computing environment, the apparatus comprising:
at least one processor operative to: (i) identify one or more components in the computing environment which depend on the at least one subject component; (ii) determine a potential condition status of a simulated condition associated with each of the one or more identified components; and (iii) cause the presentation of information to a user with respect to at least a portion of the one or more identified components based on the corresponding condition status; and
memory, coupled to the at least one processor, operative to store at least a portion of results associated with the identifying and presenting operations.

17. The apparatus of claim 16, wherein the computing environment comprises a distributed computing environment.

18. The apparatus of claim 16, wherein the computing environment comprises an autonomic computing environment.

19. The apparatus of claim 16, wherein the information presented to the user comprises a representation of a vulnerability associated with at least a portion of the one or more identified components based on the corresponding condition status.

20. The apparatus of claim 19, wherein the representation comprises a vulnerability map indicating a respective likelihood of failure associated with each of the one or more identified components.

21. The apparatus of claim 16, wherein the information presented to the user comprises at least one of a list of potentially affected end-users, a list of potentially affected components and a list of potentially affected hosts.

22. The apparatus of claim 16, wherein the information presented to the user comprises a comparison of one determination of the potential impact of the simulated condition of the at least one subject component to at least one other determination of the potential impact of the simulated condition of the at least one subject component, such that the user is able to verify whether one or more steps taken, between the one determination and the at least one other determination, to at least minimize the potential impact are substantially effective.

23. The apparatus of claim 16, wherein the at least one subject component is an existing component in the computing environment.

24. The apparatus of claim 16, wherein the at least one subject component is not an existing component in the computing environment.

25. The apparatus of claim 16, wherein the identifying operation further comprises traversing at least a portion of a model representative of an existence of one or more relationships associated with at least a portion of components of the computing environment and which is capable of accounting for a full lifecycle associated with at least one component of the computing environment.

26. The apparatus of claim 25, wherein the model is in a form comprising a functional categorization, a structural categorization and an operational categorization.

27. The apparatus of claim 26, wherein the identifying operation further comprises computing the operational categorization of the model based on at least one input criterion and traversing the operational categorization to identify the one or more components in the computing environment which depend on the at least one subject component.

28. The apparatus of claim 27, wherein the at least one input criterion comprises at least one of a name of the at least one subject component, a host associated with the at least one subject component, a direction of the traversal, a depth of the traversal, a path of the traversal and at least one filtering criterion.

29. The apparatus of claim 16, wherein the condition of the at least one subject component is one of failed, not failed and degraded.

30. An article of manufacture for determining a potential impact of a simulated condition of at least one subject component associated with a computing environment, comprising a machine readable medium containing one or more programs which when executed implement the steps of:
identifying one or more components in the computing environment which depend on the at least one subject component;
determining a potential condition status of a simulated condition associated with each of the one or more identified components; and
presenting information to a user with respect to at least a portion of the one or more identified components based on the corresponding condition status.

* * * * *